(12) United States Patent
Zhang et al.

(10) Patent No.: US 12,143,307 B2
(45) Date of Patent: Nov. 12, 2024

(54) CREATION METHOD FOR ACTION RESOURCE, EXECUTION METHOD, ELECTRONIC DEVICE, AND STORAGE MEDIUM

(71) Applicant: BOE TECHNOLOGY GROUP CO., LTD., Beijing (CN)

(72) Inventors: Qian Zhang, Beijing (CN); Junjie Zhao, Beijing (CN); Jing Su, Beijing (CN); Yanqiu Zhao, Beijing (CN); Xinan Wang, Beijing (CN); Shaobei Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 337 days.

(21) Appl. No.: 17/761,044

(22) PCT Filed: Sep. 14, 2020

(86) PCT No.: PCT/CN2020/114945
§ 371 (c)(1),
(2) Date: Mar. 16, 2022

(87) PCT Pub. No.: WO2021/052273
PCT Pub. Date: Mar. 25, 2021

(65) Prior Publication Data
US 2022/0345418 A1 Oct. 27, 2022

(30) Foreign Application Priority Data
Sep. 20, 2019 (CN) .......................... 201910894808.1

(51) Int. Cl.
*H04L 47/76* (2022.01)
*H04L 47/70* (2022.01)
*H04L 47/762* (2022.01)
*H04L 47/783* (2022.01)
*H04L 47/80* (2022.01)

(52) U.S. Cl.
CPC .......... *H04L 47/762* (2013.01); *H04L 47/783* (2013.01); *H04L 47/801* (2013.01); *H04L 47/827* (2013.01)

(58) Field of Classification Search
CPC ..... H04L 47/762; H04L 47/783; H04L 47/80; H04L 47/70; H04L 47/827; H04L 5/0048;
(Continued)

(56) References Cited

U.S. PATENT DOCUMENTS

| | | | |
|---|---|---|---|
| 2012/0113866 A1* | 5/2012 | Tenny | H04W 24/10 370/254 |
| 2018/0034777 A1* | 2/2018 | Jeong | H04W 4/70 |

(Continued)

FOREIGN PATENT DOCUMENTS

| | | |
|---|---|---|
| CN | 104678769 A | 6/2015 |
| CN | 105159079 A | 12/2015 |

(Continued)

OTHER PUBLICATIONS

Extended European Search Report in European Application No. 20866538.0 dated Sep. 5, 2023.
(Continued)

*Primary Examiner* — Wei Zhao
(74) *Attorney, Agent, or Firm* — Collard & Roe, P.C.; William Collard

(57) ABSTRACT

A creation method for creating an action resource, an execution method of an action, an electronic device, and a storage medium are provided. The creation method includes receiving a first creation request that includes a target resource; creating a first action resource, which is a resource used for triggering a first action for the target resource, according to the first creation request; creating the first action resource includes: creating at least one of a first conflict priority attribute and a first conflict priority effective
(Continued)

time attribute for the first action resource; the first conflict priority attribute represents a priority of the first action resource relative to an action resource that conflicts with the first action resource and is aimed at the target resource, and the first conflict priority effective time attribute represents a time range in which the first action resource has exclusive access to the target resource.

20 Claims, 9 Drawing Sheets

(58) Field of Classification Search
CPC ..... H04L 5/0073; H04L 47/801; H04L 47/76; H04L 47/82
See application file for complete search history.

(56) References Cited

U.S. PATENT DOCUMENTS

2018/0199356 A1 7/2018 Yang
2018/0295196 A1* 10/2018 Jeong .................... H04W 24/02

FOREIGN PATENT DOCUMENTS

| | | |
|---|---|---|
| CN | 106357596 A | 1/2017 |
| CN | 106597866 A | 4/2017 |
| CN | 107248943 A | 10/2017 |
| CN | 107797461 A | 3/2018 |
| KR | 20160094467 A | 8/2016 |
| KR | 20190049780 A | 5/2019 |
| WO | 2016/066438 A1 | 5/2016 |
| WO | 2016/122023 A1 | 8/2016 |

OTHER PUBLICATIONS

Second Chinese Office Action in Chinese Application No. 201910894808.1 dated Oct. 25, 2023 with English translation.
International Search Report in PCT/CN2020/114945, mailed Dec. 11, 2020, with English Translation.
Written Opinion of the International Searching Authority in PCT/CN2020/114945, mailed Dec. 11, 2020, with English Translation.

* cited by examiner

CREATION METHOD FOR ACTION RESOURCE, EXECUTION METHOD, ELECTRONIC DEVICE, AND STORAGE MEDIUM

CROSS REFERENCE TO RELATED APPLICATIONS

This application is the National Stage of PCT/CN2020/114945 filed on Sep. 14, 2020, which claims priority under 35 U.S.C. § 119 of Chinese Application Ser. No. 20/191, 0894808.1 filed on Sep. 20, 2019, the disclosure of which is incorporated by reference.

TECHNICAL FIELD

The embodiments of the present disclosure relate to a creation method for creating an action resource, an execution method of an action, an electronic device, and a computer-readable storage medium.

BACKGROUND

With the rapid development of Internet of Things technology in various application fields, more and more devices are connected to the Internet of Things, and various new application fields, such as smart home, smart transportation, smart health, and so on, have emerged. The Internet of Everything is the development trend of the Internet of Things. In the Internet of Things system, an application entity used as an application program can deploy services on a common service entity used as a service platform. After the service of the application program is deployed to the service platform, the process of achieving the service of the application program can be performed without the participation of the application program, and the operation of the service can be implemented directly on the service platform. The service platform can provide a public service function for many different application programs from different manufacturers, and the network connection among many different application programs is achieved through the service platform, so as to achieve the Internet of Everything.

SUMMARY

At least one embodiment of the present disclosure provides a creation method for creating an action resource, comprising: receiving a first creation request, the first creation request comprising a target resource; and creating a first action resource, which is a resource used for triggering a first action for the target resource, according to the first creation request. Creating the first action resource comprises: creating at least one selected from a group consisting of a first conflict priority attribute and a first conflict priority effective time attribute for the first action resource. The first conflict priority attribute represents a priority of the first action resource relative to an action resource that conflicts with the first action resource and is aimed at the target resource, and the first conflict priority effective time attribute represents a time range in which the first action resource has exclusive access to the target resource.

For example, in the method provided by an embodiment of the present disclosure, creating the first action resource further comprises: creating a first conflict target resource attribute and a first conflict target action attribute for the first action resource. The first conflict target resource attribute represents an identification code of the target resource, and the first conflict target action attribute represents an action that conflicts with the first action.

For example, in the method provided by an embodiment of the present disclosure, creating the first action resource further comprises: creating a first conflict target resource attribute and a first conflict target action attribute for the first action resource. The first conflict target resource attribute represents an identification code of the target resource, the first conflict target action attribute represents an action that conflicts with the first action, the first action resource comprises a conflict policy sub-resource, and the conflict policy sub-resource comprises the first conflict target resource attribute, the first conflict target action attribute, and at least one selected from the group consisting of the first conflict priority attribute and the first conflict priority effective time attribute.

For example, in the method provided by an embodiment of the present disclosure, creating the first action resource further comprises: creating a first action status attribute for the first action resource. The first action status attribute represents a status of the first action.

For example, in the method provided by an embodiment of the present disclosure, creating the first action resource further comprises: creating a first action time attribute for the first action resource. The first action time attribute is used to indicate a time parameter related to the first action.

For example, in the method provided by an embodiment of the present disclosure, the time parameter related to the first action comprises at least one selected from a group consisting of a duration after the first action is executed, start time of executing the first action, and end time of executing the first action.

At least one embodiment of the present disclosure further provides an execution method of an action, and the execution method comprises: determining a first action resource, the first action resource being a resource used for triggering a first action for a target resource, the first action resource comprising a first conflict priority attribute, and the first conflict priority attribute representing a priority of the first action resource relative to an action resource that conflicts with the first action resource and is aimed at the target resource; receiving a first data resource; determining a second action resource, conflicting with the first action resource, based on the first data resource meeting a first triggering condition, the second action resource being a resource used for triggering a second action for the target resource, the second action resource comprising a second conflict priority attribute and a second conflict priority effective time attribute, the second conflict priority attribute representing a priority of the second action resource relative to an action resource that conflicts with the second action resource and being aimed at the target resource, and the second conflict priority effective time attribute representing a time range in which the second action resource has exclusive access to the target resource; acquiring and judging whether an attribute value of the first conflict priority attribute, an attribute value of the second conflict priority attribute, and an attribute value of the second conflict priority effective time attribute meet a conflict judgment condition, executing the first action on the target resource if the conflict judgment condition is met; not executing the first action if the conflict judgment condition is not met.

For example, in the execution method provided by an embodiment of the present disclosure, meeting the conflict judgment condition comprises that: the attribute value of the first conflict priority attribute has priority over the attribute value of the second conflict priority attribute; or an occupation duration of the second action resource for the target resource is greater than or equal to the attribute value of the second conflict priority effective time attribute; or the attribute value of the first conflict priority attribute has priority over the attribute value of the second conflict priority attribute, and the occupation duration of the second action resource for the target resource is greater than or equal to the attribute value of the second conflict priority effective time attribute.

For example, in the execution method provided by an embodiment of the present disclosure, judging whether the attribute value of the first conflict priority attribute, the attribute value of the second conflict priority attribute, and the attribute value of the second conflict priority effective time attribute meet the conflict judgment condition comprises: judging whether the attribute value of the first conflict priority attribute has priority over the attribute value of the second conflict priority attribute, and in a case where the attribute value of the first conflict priority attribute has priority over the attribute value of the second conflict priority attribute, determining that the conflict judgment condition is met; and in a case where the attribute value of the first conflict priority attribute does not have priority over the attribute value of the second conflict priority attribute, acquiring the occupation duration of the second action resource for the target resource, and judging whether the occupation duration of the second action resource for the target resource is greater than the attribute value of the second conflict priority effective time attribute, in a case where the occupation duration of the second action resource for the target resource is greater than or equal to the attribute value of the second conflict priority effective time attribute, determining that the conflict judgment condition is met; and in a case where the occupation duration of the second action resource for the target resource is less than the attribute value of the second conflict priority effective time attribute, determining that the conflict judgment condition is not met.

For example, in the execution method provided by an embodiment of the present disclosure, the second action resource further comprises a second action time attribute, acquiring the occupation duration of the second action resource for the target resource comprises: acquiring an attribute value of the second action time attribute as the occupation duration of the second action resource for the target resource.

For example, in the execution method provided by an embodiment of the present disclosure, determining the second action resource that conflicts with the first action resource comprises: determining a candidate action resource list according to the target resource and the first action, a candidate target resource corresponding to each candidate action resource in the candidate action resource list being identical to the target resource, and a candidate action of each candidate action resource conflicting with the first action; selecting at least one candidate action resource from the candidate action resource list; acquiring an execution status of the at least one candidate action resource; and in a case of determining that the execution status of the at least one candidate action resource is already executed, taking the at least one candidate action resource as the second action resource.

For example, in the execution method provided by an embodiment of the present disclosure, the first action resource comprises a conflict policy sub-resource, the conflict policy sub-resource comprises the first conflict priority attribute, a first conflict priority effective time attribute, a first conflict target resource attribute, and a first conflict target action attribute, the first conflict priority effective time attribute represents a time range in which the first action resource has exclusive access to the target resource, the first conflict target resource attribute represents an identification code of the target resource, and the first conflict target action attribute represents an action that conflicts with the first action, determining the second action resource that conflicts with the first action resource comprises: acquiring the first conflict target resource attribute and the first conflict target action attribute, and determining a candidate action resource list according to the first conflict target resource attribute and the first conflict target action attribute, an identification code of a candidate target resource corresponding to each candidate action resource in the candidate action resource list being identical to the first conflict target resource attribute, and a candidate action of each candidate action resource being identical to the first conflict target action attribute; selecting at least one candidate action resource from the candidate action resource list; acquiring an execution status of the at least one candidate action resource; in a case of determining that the execution status of the at least one candidate action resource is already executed, taking the at least one candidate action resource as the second action resource.

For example, in the execution method provided by an embodiment of the present disclosure, each candidate action resource comprises an action status attribute, acquiring the execution status of the at least one candidate action resource comprises: acquiring an attribute value of an action status attribute of the at least one candidate action resource as the execution status of the at least one candidate action resource.

For example, in the execution method provided by an embodiment of the present disclosure, the first action and the second action conflict with each other.

For example, in the execution method provided by an embodiment of the present disclosure, the first action and the second action are opposite to each other.

At least one embodiment of the present disclosure further provides an execution method of an action, and the execution method comprises: determining a first action resource, the first action resource being a resource used for triggering a first action for a target resource, the first action resource comprising a first conflict priority attribute, and the first conflict priority attribute representing a priority of the first action resource relative to an action resource that conflicts with the first action resource and is aimed at the target resource; receiving a first data resource; determining a second action resource, which conflicts with the first action resource, based on the first data resource meeting a first triggering condition, the second action resource being a resource used for triggering a second action for the target resource, the second action resource comprising a second conflict priority attribute, and the second conflict priority attribute representing a priority of the second action resource relative to an action resource that conflicts with the second action resource and is aimed at the target resource; acquiring and judging whether an attribute value of the first conflict priority attribute and an attribute value of the second conflict priority attribute meet a conflict judgment condition, executing the first action on the target resource if the conflict judgment condition is met; not executing the first action if the conflict judgment condition is not met.

At least one embodiment of the present disclosure further provides an electronic device, comprising: a memory, for storing computer-readable instructions in a non-transitory manner; and a processor, for executing the computer-readable instructions. In a case where the computer-readable instructions are executed by the processor, the creation method for creating an action resource according to any one of the embodiments is performed.

At least one embodiment of the present disclosure further provides an electronic device, comprising: a memory, for storing computer-readable instructions in a non-transitory manner; and a processor, for executing the computer-readable instructions. The computer-readable instructions, when executed by the processor, cause the processor to execute the execution method of an action according to any one of the embodiments.

At least one embodiment of the present disclosure further provides a computer-readable storage medium, storing computer-readable instructions non-temporarily. In a case where the computer-readable instructions are executed by a computer, the computer is caused to execute the creation method for creating an action resource according to any one of the embodiments or the execution method of an action according to any one of the embodiments.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
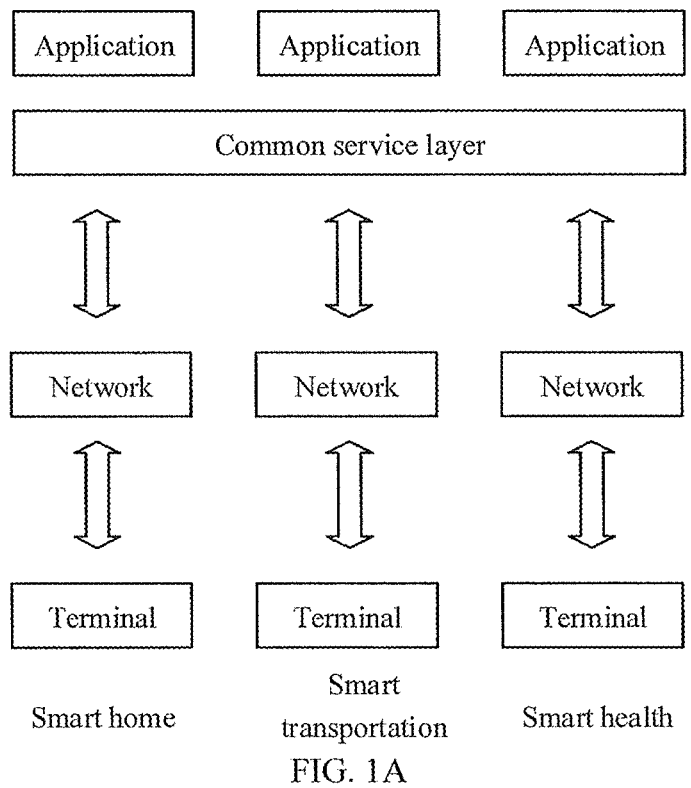
FIG. 1A shows a schematic architecture diagram of the Internet of Things provided by an embodiment of the present disclosure.

In order to make objects, technical solutions, and advantages of the embodiments of the present disclosure more apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used in the present disclosure have the same meanings as commonly understood by one of ordinary skill in the art to which the present disclosure belongs. The terms "first," "second," etc., which are used in the present disclosure, are not intended to indicate any sequence, amount, or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left", and the like are only used to indicate relative position relationship, and when the absolute position of the object which is described is changed, the relative position relationship may be changed accordingly.

In order to keep the following description of the embodiments of the present disclosure clear and concise, detailed descriptions of some known functions and components are omitted in the present disclosure.

The Internet of Things can be regarded as an extension of the Internet, the Internet of Things includes the Internet and all resources on the Internet, and is compatible with all applications of the Internet. The Internet of Things links sensors, controllers, machines, people, objects, and the like in a new way by using communication technologies, such as local network or the Internet, and forms the link between people and things and the link between things and things.

With the development of the Internet of Things technology, more and more terminal devices (such as carbon monoxide detectors, smoke alarms, fire alarms, air detectors, etc.) are connected to the Internet of Things platform. The Internet of Things platform can be implemented as a common service entity (CSE), for example. The terminal device can be connected to the common service entity by sending registration information to the common service entity, and the common service entity manages the terminal device connected to the common service entity. The terminal device can be represented as an application entity (AE), and the application entity connected to the common service entity can perform some operations, such as, data transmission, information interaction, and so on, with the common service entity.

It should be noted that the application entity described in the present disclosure can be an Internet of Things terminal device, or can also be a software module and the like in the device. The application entity and the common service entity are logical entities, a physical device include the logical entities, a simple terminal device can only include the application entity, a complex terminal device can include the application entity and the common service entity, and a server at least includes the common service entity and may include the application entity. The difference between the common service entity included in the terminal device and the common service entity included in the server lies in the difference in functions. The common service entity of the server includes more functions than the common service entity of the terminal device, such as device management and other functions.

FIG. 1A shows a schematic architecture diagram of the Internet of Things provided by an embodiment of the present disclosure. As shown in FIG. 1A, client devices of various terminals access the network and access a common service layer through the network, and the common service layer supports various applications, thus forming a terminal+network+application architecture. For example, in a field of smart home, various household devices can use a local area network (LAN) to access the common service layer, and such accessing by the LAN can adopt a wireless method or a wired method. Optionally, the local area network can be a personal area network (PAN), for example, taking a wireless personal area network (WPAN) as an example, various technologies, such as Bluetooth, IrDA, Home RF, ZigBee, or UWB (Ultra-Wideband Radio) can be used to achieve that the various household devices access the common service layer.

In the present disclosure, the described entities, such as the application entity AE, the common service entity CSE, data, and so on, can be represented by resources. A resource can have a unique identifier, and the resource includes attributes and a sub-resource depending on the conditions, the attributes are used to store information related to the resource, the sub-resource is a next-level resource of the resource, and the resource includes an indexes pointing to the sub-resource.

For example, according to different usage scenarios, a plurality of different action resources can be set for the same target resource (that is, a target object) in different situations. Triggering conditions of the action resources set for the same target resource can be different, and actions set for the target resource can be the same or different. The action resources as shown in FIG. 1C below are only a schematic example, and in fact, those skilled in the art can set any action trigger event according to the actual situation. In some embodiments, the action-triggered events can be divided into a position event (setting a certain position to generate the event), a time event (setting a certain time to generate the event), an operation event (setting a certain operation to generate the event), a user event (for example, perceiving the presence of a certain user), and the like.

For example, in some examples, the operations for a small light may include turn-on and turn-off. For example, in the case where it is detected that the user gets up during the night or during sleep, the small light can be turned on. In the case where it is detected that the user is lying on the bed during the night or during sleep, the small light can be turned off. For example, in the case where a sunny day, gas leakage, or a smoke alarm is detected, a window can be opened. In the case where a cloudy day, a rainy day, or a snowy day is detected, the window can be closed.

In some embodiments, the action resource can also be set for a plurality of target resources. For example, in the case where a position sensor detects the presence of a person in a certain range, a plurality of target resources (such as, an air conditioner, an air purifier, a light, etc.) can be controlled to be turned on.

In other embodiments, the action resource can also set a plurality of triggering conditions for the action of the target resource. For example, in the case where a temperature sensor detects that a temperature is higher or lower than a preset temperature threshold, and a human body sensor detects that there is a person in a room, an air conditioner can be controlled to be turned on or off.

In the complex usage environment (such as, a smart home scene, etc.), in order to enable the user experience to be better, it is necessary to set a plurality of different action resources for each application device, so that each application device can perform appropriate functions in different usage environments. Therefore, in the smart home scene, there may be many different action resources for the same target resource. Therefore, a situation that conflicting action instructions are performed on the same target resource at the same time or successively may be exist. For example, in rainy weather, the server controls the window to be closed, however, if a smoke alarm detects that the smoke content in the air exceeds a standard content at the same time, the server will control the window to be opened. In this case, if it is detected first that the smoke content in the air exceeds the standard content, the server will control the window to be opened, and if rain is detected later, the server will control the window to be closed.

Understandably, if the smoke alarm detects that the smoke content in the air exceeds the standard content, it means that there may be an emergency, such as fire, in the room. In this case, if the server controls the window to be closed because the rain is detected, it may cause danger to people in the room. In addition, if the triggering conditions of two different actions for the same target resource are met at the same time, it will be difficult for the server to effectively control the target resource.

Figure 1B:
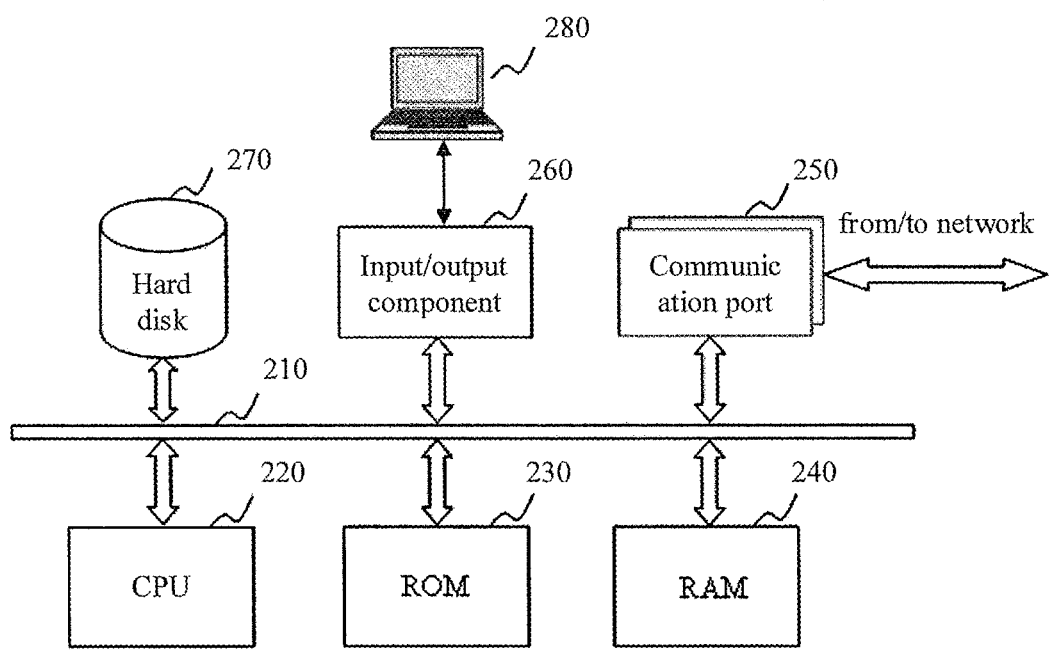
FIG. 1B shows a schematic diagram of a server/client device provided by an embodiment of the present disclosure.
Figure 1C:
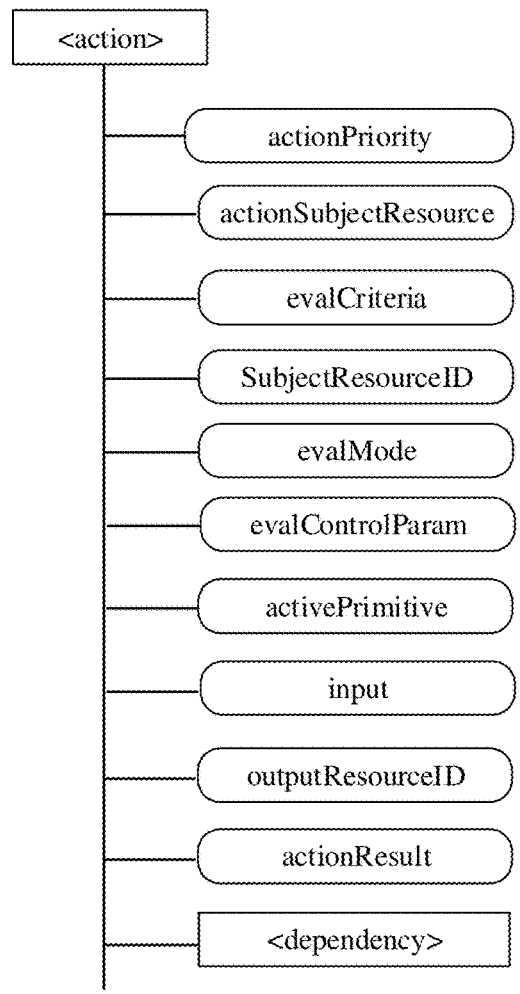
FIG. 1C shows a schematic diagram of an example of an action resource provided by some embodiments of the present disclosure.

FIG. 1B shows a schematic diagram of a server/client device provided by an embodiment of the present disclosure. In the Internet of Things system, the server can be used to implement the above service platform, and the client device can be used to implement the above terminal device.

The computer device as shown in FIG. 1B can be used to implement the server device or the client device disclosed in the present disclosure. Such computers can include a personal computer, a notebook computer, a tablet computer, a mobile phone, a personal digital assistance (PDA), smart glasses, a smart watch, a smart ring, a smart helmet, and any smart portable devices or wearable devices. In some embodiments, various smart home terminal devices in the Internet of Things system, such as smart switches, smart gateways, smart rice cookers, smart purifiers, etc., can also be implemented by using the architecture of the computer device as shown in FIG. 1B. The specific system in the embodiment uses the functional block diagram to explain a hardware platform with a user interface. This kind of computer device can be a general purpose computer device or a special purpose computer device. Both kinds of computer devices can be used to implement the server device or the client device of the terminal in this embodiment. The computer system can implement any components currently described to provide information needed for communication in the Internet of Things. For example, the computer system can be implemented by the computer device through its hardware devices, software programs, firmware, and their combinations. For convenience, only one computer device is shown in FIG. 1B, but the related computer functions for providing information needed for the communication in the Internet of Things described in this embodiment can be implemented by a group of similar platforms in a distributed manner, thus dispersing the processing load of the computer system.

As shown in FIG. 1B, the computer system may include a communication port 250, to which a network for data communication is connected. The computer system may also include a processor group 220 for executing program instructions. The processor group 220 may be composed of at least one processor (e.g., CPU). The computer system may include an internal communication bus 210. The computer system may include program storage units and data storage units in various forms, such as a hard disk 270, a read only memory (ROM) 230, and a random access memory (RAM) 240, which can be used to store various data files used by the computer for processing and/or communication, and possible program instructions executed by the processor group 220. The computer system can also include an input/output component 260 that supports the input/output data flow between the computer system and other components (such as, a user interface 280). The computer system can also send and receive information and data through the communication port 250.

In some embodiments, the above computer system can be used to constitute a server in the Internet of Things communication system. The server of the Internet of Things communication system can be a server hardware device or a server group. The respective servers in the server group can be connected through a wired or wireless network. The server group can be centralized, such as a data center. The server group can also be distributed, such as a distributed system.

The client application entity AE, the client common service entity CSE, the server application entity AE, and/or the server common service entity CSE involved in the present disclosure can be implemented by using the computing system provided in FIG. 1B.

FIG. 1C shows a schematic diagram of an example of an action resource provided by some embodiments of the present disclosure.

Taking an oneM2M protocol architecture as an example, the entity can be all entities in the oneM2M system, such as a M2M (Machine to Machine) device, a M2M gateway, a M2M application layer, etc. Under the oneM2M architecture, the resource can be uniquely addressed. To represent the resource, the structure of the resource can be specified. As shown in FIG. 1C, the action resource may include at least one attribute and/or sub-resource. For example, the action resource<action> can include: an action priority attribute (actionPriority) indicating a priority of the action resource, a subject resource address attribute (actionSubjectResource) indicating an object to be detected of the action resource, a subject resource identification attribute (SubjectResourceID) indicating the object to be detected of the action resource, an evaluation criteria attribute (evalCriteria) indicating an action triggering condition of the action resource, a trigger mode attribute (evalMode) indicating a trigger mode of the action resource, a trigger mode control attribute (evalControlParam) indicating the trigger mode of the action resource, an object identification attribute (objectResourceID) indicating a control target of the action resource, an action attribute (activePrimitive) indicating an action mode of the action resource, an input attribute (input) indicating an action parameter of the action resource, an output resource identification attribute (outputResourceID) indicating an action result of the action resource, an action result attribute (actionResult) indicating the action result of the action resource, and a dependency sub-resource (<dependency>) indicating a dependency condition of the action executed by the action resource. For example, the action resource can also include a plurality of dependency sub-resources.

It should be noted that the action priority indicates the priority among the plurality of action resources triggered by the same triggering condition. For example, in the case where the concentration of the carbon monoxide in the air is greater than a preset threshold, both the window and the door can be controlled to be opened, and the action priority indicates the priority, that is, the sequence, between the action resource corresponding to controlling to open the window and the action resource corresponding to controlling to open the door. For example, in the case where the action priority of the action resource with the window as the target resource has priority over the action priority of the action resource with the door as the target resource, then in the case where the concentration of the carbon monoxide in the air is greater than the preset threshold, the window is firstly controlled to be opened, and then the door is controlled to be opened.

For example, the subject resource attribute of the action resource can be updated in a predefined way. For example, the application entity registered on the server can send information to the server periodically, in real time, or in response to the occurrence of a preset event to update the subject resource attribute. In the case where the information received from the application entity enables an evaluation criteria of the action resource to meet the action triggering condition of the action resource, a preset action can be executed for a target resource corresponding to the target identification attribute of the action resource. In the present disclosure, the subject resource attribute can also be simply referred to as a subject resource.

In some embodiments, the evaluation criteria attribute may include at least one triggering condition, and the dependency sub-resource may include at least one dependency condition. The action resource as shown in FIG. 1C is used to perform a preset action, that is, the action defined in the action attribute, on the target resource corresponding to the target identification attribute in the case where the triggering condition included in the evaluation criteria attribute and the dependency condition included in the dependency sub-resource are met.

Although the present disclosure shows a schematic example of implementing the action resource, those skilled in the art can understand that the action resource mentioned above can be set in other ways according to different actual situations.

Figure 2:
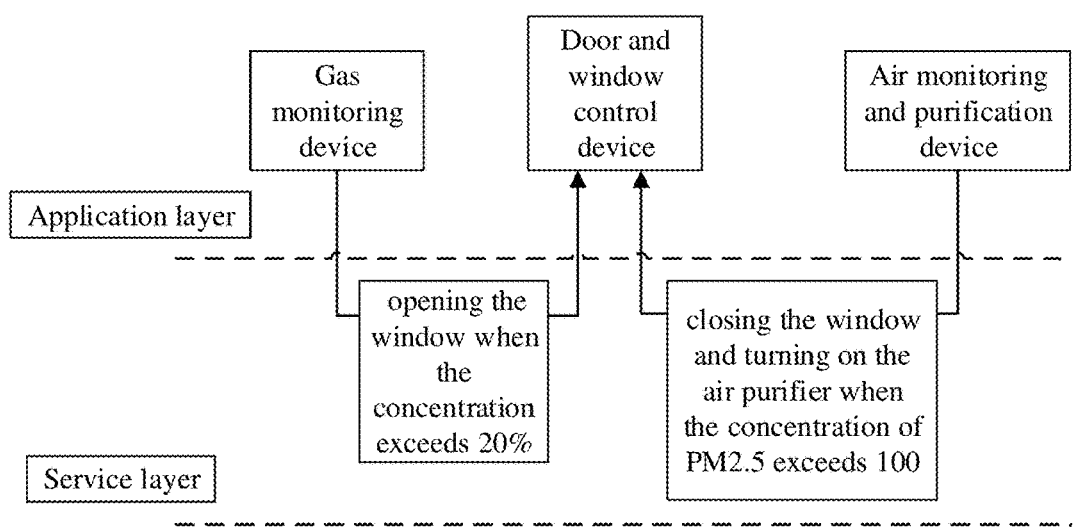
FIG. 2 is a schematic diagram of a smart home scene in the Internet of Things environment provided by some embodiments of the present disclosure.

FIG. 2 is a schematic diagram of a smart home scene in the Internet of Things environment provided by some embodiments of the present disclosure.

For example, in an example, taking the smart home scene as an example, in the smart home scene, there are three application entities, which are a door and window control device, a gas monitoring device (for example, provided by a smart security provider), and an air monitoring and purification device (for example, provided by a smart home appliance provider). It can be understood that in the case where there are a plurality of intelligent control devices in the Internet of Things environment of the smart home, the application entity can deploy a plurality of services to the same target resource (that is, the target object), that is, create a plurality of action resources for the same target resource, and the plurality of actions of the plurality of action resources for the target resource and the triggering conditions of the plurality of actions can be different.

As shown in FIG. 2, the application entities are correspondingly arranged in the application layer, and the common service entity is arranged in the service layer (i.e. the Internet of Things platform). The actions provided by the gas monitoring device and the air monitoring and purification device through the service layer both act on the door and window control device. The gas monitoring device can request to create an action resource 1 on the common service entity, the action resource 1 indicates that the gas monitoring device detects the concentration of carbon monoxide in the air through a carbon monoxide sensor, and in the case where the concentration of carbon monoxide exceeds a preset threshold (for example, 20%), the common service entity can trigger the door and window control device to open the window (or the door) for ventilation and reduce the concentration of combustible gas (for example, the carbon monoxide). The air monitoring and purification device can request to create an action resource 2 on the common service entity, the action resource 2 indicates that the air monitoring and purification device uses an air quality monitoring sensor (such as a smog sensor) to detect the concentration of PM2.5 (smog) in the air, and in the case where the concentration of PM2.5 exceeds a preset threshold, the common service entity can trigger the door and window control device to close the window (or door) and then turn on the air purification device to reduce the concentration of PM2.5 in the air. The above two action resources are all aimed at the same execution unit (i.e. the door and window control device). However, the action resource 1 controls the door and window control device to perform a window opening operation, and the action resource 2 controls the door and window control device to perform a window closing operation, so that the action resource 1 and the action resource 2 may conflict. Here, the conflict can indicate that: firstly, two action resources need to be triggered at the same time, and the two operations performed by the door and window control device are opposite; and secondly, the other action resource triggers after one action resource, but the concrete effect actually produced by the other action resource is opposite to the effect that the one action resource needs to achieve.

The embodiment of the present disclosure provides a creation method for creating an action resource, an execution method of an action, an electronic device, and a computer readable storage medium. In the creation method for creating the action resource, by adding at least one of a conflict priority attribute and a conflict priority effective time attribute to the action resource, the conflict problem of the action resource can be solved.

It should be noted that in the embodiment of the present disclosure, the creation method for creating the action resource and the execution method of an action are both executed by the common service entity. In the present disclosure, the flowchart is used to illustrate the steps of the method according to an embodiment of the present disclosure. It should be understood that the preceding or following steps are not necessarily performed exactly in order. Instead, various steps can be processed in reverse order or simultaneously. At the same time, other operations can also be added to these processes, or a step or steps can be removed from these processes.

Figure 3:
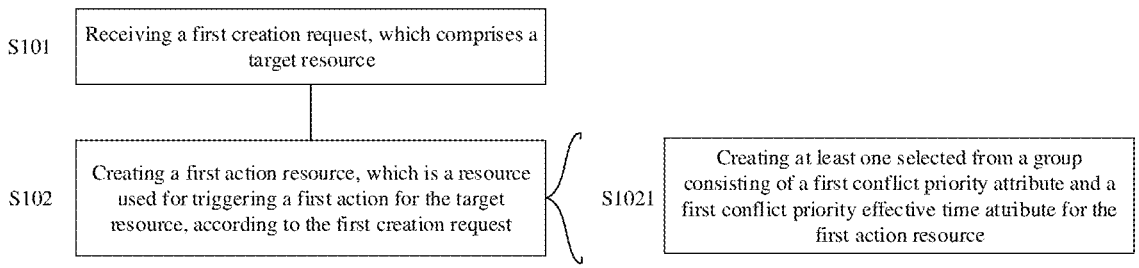
FIG. 3 shows a flow chart of a creation method for creating an action resource provided by some embodiments of the present disclosure.

FIG. 3 shows a flow chart of a creation method for creating an action resource provided by some embodiments of the present disclosure. For example, taking the use environment of the smart home as an example, the above-mentioned common service entity can be implemented as a home management server, and the application entity (the application program) can be implemented as a home management application (for example, a carbon monoxide sensor, a temperature sensor, a door and window sensor, etc.).

For example, as shown in FIG. 3, in some embodiments, the creation method for creating the action resource may include:

S101: receiving a first creation request, which comprises a target resource;

S102: creating a first action resource, which is a resource used for triggering a first action for the target resource, according to the first creation request.

For example, the first creation request is used to request the common service entity to create the first action resource.

For example, the target resource can be a window, a door, an air purifier, a lamp, an air conditioner, etc.

It should be noted that, in some embodiments provided by the present disclosure, taking an action performed on the window as an example, that is, the target resource is the window, and the common service entity can send a notice to the window controller to control the opening and closing of the window. In the present disclosure, "triggering the first action" may mean triggering and executing the first action.

For example, the first action may include any operation, such as an opening operation, a closing operation, an operation of lighting up a lamp, an operation of dimming a lamp, an operation of raising temperature, an operation of lowering temperature, etc. It should be noted that in the present disclosure, if the target resource is the air conditioner, if the action of turning on the air conditioner for refrigeration needs to be performed, the first action can include the operation of turning on the air conditioner and the operation of setting the air conditioner to the refrigeration mode, that is, in the present disclosure, the operation corresponding to the action resource can include a plurality of operations for the target resource, so as to finally achieve the preset effect. For example, in the above example, the first action can include two operations, namely, the operation of turning on the air conditioner and the operation of setting the air conditioner to the refrigeration mode, so as to achieve the effect of turning on the air conditioner for refrigeration.

For example, in the case where the first triggering condition is met, the first action can be triggered for the target resource, and the first triggering condition can be set according to the actual situation. For example, in some examples, the first triggering condition can be various conditions, such as, the concentration of carbon monoxide is higher than the preset threshold, the concentration of PM2.5 exceeds the preset threshold, the brightness of the indoor light is higher or lower than the preset threshold, the user is detected within a certain range (for example, in a bedroom, a living room, etc.), and the temperature is higher or lower than the preset temperature threshold, etc.

For example, the first creation request can be sent by the application entity (e.g., the air detection device) to the common service entity, or created by the user in the common service entity for the application entity.

For example, in the case where the application entity needs to deploy an action on the service platform, the application entity can send a creation request for creating the action resource of this action to the service platform, so that the common service entity deployed on the service platform can create the action resource. For example, in some examples, the first action resource is a resource for triggering to close the window (i.e., the first action) for the window (i.e., the target resource), for example, the first action resource indicates a resource of "executing a closing operation for a window in the case where it is detected that the concentration of PM2.5 in the air is higher than the preset threshold A (e.g., 100, 150, etc.)", the first triggering condition is that the concentration of PM2.5 is higher than the preset threshold A, the target resource is the window, and the first action is to close the window. The preset threshold A can be set according to the actual application requirements. For example, the application entity can send a first creation request to the common service entity (such as, a home management server), and deploy a first action resource: performing a closing operation for the window in the case where it is detected that the concentration of PM2.5 in the air is higher than the preset threshold A, on the common service entity after the common service entity passes the identity verification of the application entity. For example, the concentration of PM2.5 in the air can be detected by an air quality monitoring sensor registered to the service platform, and the closing operation for the window can be performed by a window controller registered to the service platform.

For example, as shown in FIG. 3, in the step S102, creating a first action resource includes S1021: creating at least one selected from a group consisting of a first conflict priority attribute and a first conflict priority effective time attribute for the first action resource.

In the embodiments of the present disclosure, the conflict priority and the conflict priority effective time of the action resource can be utilized, so that an action with a low priority does not affect the execution of an action with a high priority, and after the execution of the action with a high priority exceeds the conflict priority effective time of the action with a high priority, the action with a low priority can operate on the same target resource, thus avoiding the conflict between different action resources and improving the execution efficiency of the action.

Figure 4:
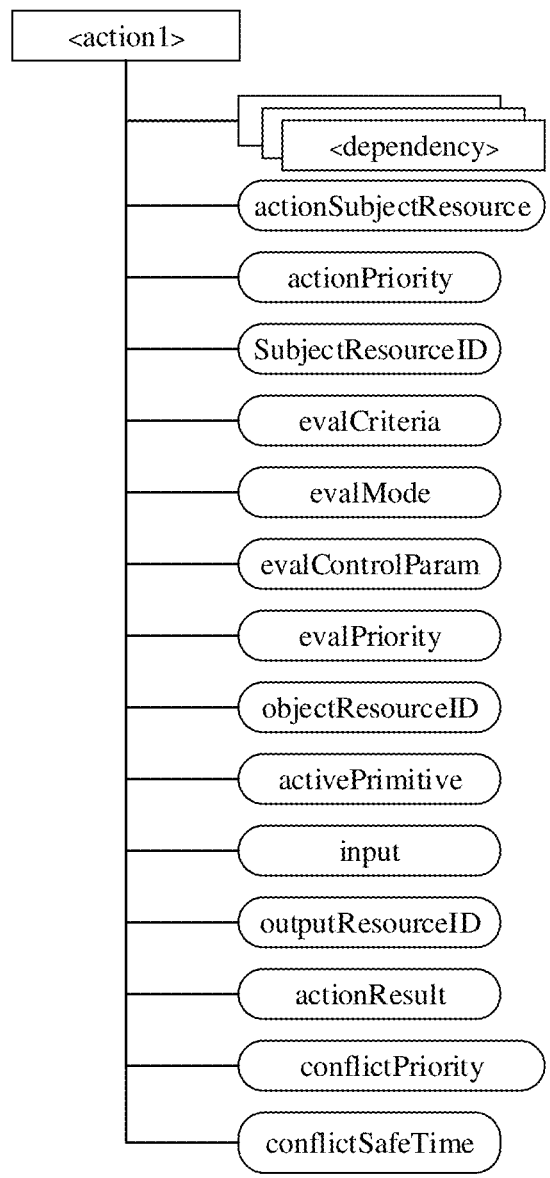
FIG. 4 shows a schematic diagram of a first action resource provided by some embodiments of the present disclosure.

FIG. 4 shows a schematic diagram of a first action resource provided by some embodiments of the present disclosure.

For example, as shown in FIG. 4, the first action resource (<action1>) may include a first conflict priority attribute (conflictPriority). The first conflict priority attribute represents a priority of the first action resource relative to an action resource that conflicts with the first action resource and is aimed at the target resource, that is, in the present disclosure, the conflict priority attribute is priorities (i.e., the execution order) of the plurality of action resources aiming at the same target resource, and the plurality of action resources conflict with each other. It should be noted that the number of action resources that conflict with the first action resource may be one or more. In addition, there may also be no action resource that conflicts with the first action resource, that is, the plurality of action resources deployed on the common service entity except the first action resource do not conflict with the first action resource.

For example, the first conflict priority attribute can be preset according to the actual application scenario. In the case where an action resources is created, the priority of the action resource can be determined according to the target resource and rules included in the creation request of the action resource. In an example, the priority of an action resource corresponding to a security-type device can be set to the highest, the priority of an action resource corresponding to a protection-type device can be set to the secondary highest, and the priority of an action resource corresponding to a health-type device can be set to the lowest. For example, the security-type device can refer to a carbon monoxide sensor, a smoke alarm, and so on. The protective-type device can refer to a smog sensor and so on, and the health-type device can refer to a temperature sensor and so on.

For example, in the embodiments of the present disclosure, the conflict priority attribute can be expressed by a natural number. For example, the smaller the value of the conflict priority attribute, the higher the conflict priority. For example, in the case where the value of the conflict priority attribute of an action resource is 1, it indicates that the conflict priority of the action resource is the highest. Those skilled in the art can understand that the conflict priority can be set in any way without departing from the principles of the present disclosure. For example, it can also be set that the higher the value of the conflict priority attribute, the higher the conflict priority. At this time, in the case where the value of the conflict priority attribute of the action resource is 1, it means that the conflict priority of the action resource is the lowest.

It should be noted that in the present disclosure, the conflict priority attribute can also be set for the plurality of action resources that are in one-to-one correspondence to a plurality of different target resources.

For example, as shown in FIG. 4, the first action resource may also include a first conflict priority effective time attribute (conflictSafeTime). In the present disclosure, the conflict priority effective time represents the set safety action time after the conflict priorities of action resources for the same target resources are compared.

For example, the first conflict priority effective time attribute represents the time range in which the first action resource has exclusive access to the target resource. In the present disclosure, for the first action resource, "exclusive time range" represents a time range in which the first action resource has exclusive access to the target resource with respect to the other action resources with a lower priority than the first action resource, that is, any action resource with a lower priority than the first action resource cannot operate the target resource within this duration range. It should be noted that not all high-priority actions and low-priority actions are persistent actions, but most actions are instantaneous command actions. After the application entity accepts the command, the application entity may maintain the status after the command is executed. The main function of the conflict priority effective time attribute is that the command for the low-priority action breaks through the restriction of the command for the high-priority action, and to give certain effective time to the command for the high-priority action. In this effective time range, the command for the high-priority action is exclusive to the target object (that is, the target resource), beyond the effective time range, the high-priority action is no longer exclusive to the target object, and the low-priority action can issue a command and execute a corresponding action on the target object. The effective time is the conflict priority effective time. The first conflict priority effective time attribute can also be preset according to the actual application scenario.

Figure 5:
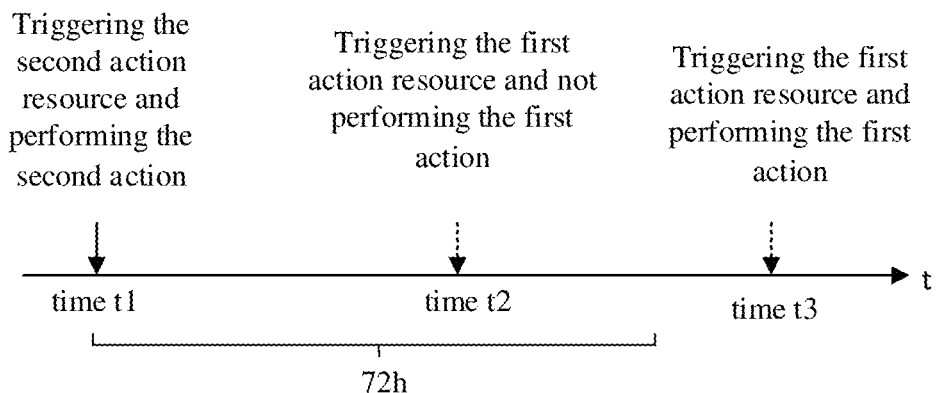
FIG. 5 shows a schematic diagram of a triggering process of a first action resource and a second action resource provided by some embodiments of the present disclosure.

FIG. 5 shows a schematic diagram of a triggering process of a first action resource and a second action resource provided by some embodiments of the present disclosure.

For example, in some examples, the second action resource is also deployed on the common service entity, the second action resource is a resource that triggers a second action for the target resource, and the second action resource conflicts with the first action resource. For example, the second action resource is a resource for triggering the opening operation (that is, the second action includes the opening operation) for the window, for example, in the case where it is detected that the concentration of carbon monoxide in the air is higher than a preset threshold B (for example, 20%), the opening operation is performed on the window. The second action resource may include a second conflict priority attribute and a second conflict priority effective time attribute, the second conflict priority attribute represents a priority of the second action resource relative to an action resource that conflicts with the second action resource and is aimed at the target resource, and the second conflict priority effective time attribute represents the time range in which the second action resource has exclusive access to the target resource. For example, the first action resource is a resource for triggering the closing operation (that is, the first action includes the closing operation) for the window, for example, in the case where it is detected that the concentration of PM2.5 in the air is higher than a preset threshold (for example, 150), the closing operation is performed on the window. That is, the target resource of the first action resource and the target resource of the second action resource are the same, for example, the target resource of the first action resource and the target resource of the second action resource are both the window, and the first action and the second action conflict with each other, for example, the first action can be to close the window and the second action can be to open the window.

It should be noted that, in the present disclosure, "the second action resource conflicts with the first action resource" can represent that the target resource of the first action resource is the same as the target resource of the second action resource, and the first action corresponding to the first action resource and the second action corresponding to the second action resource conflict with each other.

For example, as shown in FIG. 5, on a time axis t, the time t1 is before the time t2, and the time t2 is before the time t3.

In some examples, as shown in FIG. 5, at the time t1, the second action resource is triggered firstly and the second action is performed, that is, the opening operation is performed on the window. At the time t2, the first action resource is triggered, if the conflict priority of the second action resource is prior to the conflict priority of the first action resource and the interval between the time t1 and the time t2 (for example, the interval between the time t1 and the time t2 is 40 hours) is less than the duration (for example, 72 hours (h)) represented by the second conflict priority effective time attribute corresponding to the second action resource, the first action corresponding to the first action resource cannot be performed. At the time t3, the first action resource is triggered, and the interval between the time t1 and the time t3 (for example, the interval between the time t1 and the time t3 is 80 hours) is greater than the duration represented by the second conflict priority effective time attribute corresponding to the second action resource, at this time, the first action corresponding to the first action resource can be performed, that is, the closing operation can be performed on the window.

In other examples, at the time t1, the second action resource is triggered firstly and the second action is performed, that is, the opening operation is performed on the window; at the time t2, the first action resource is triggered; if the conflict priority of the first action resource is prior to the conflict priority of the second action resource, that is, the priority represented by the first conflict priority attribute is prior to the priority represented by the second conflict priority attribute, the first action corresponding to the first action resource can be performed, that is, the closing operation can be performed on the window.

In other examples, at the time t1, the second action resource is triggered firstly and the second action is performed, that is, the opening operation is performed on the window; at the time t2, the first action resource is triggered; if the conflict priority of the second action resource is prior to the conflict priority of the first action resource, and the interval between the time t1 and the time t2 is greater than the duration represented by the second conflict priority effective time attribute corresponding to the second action resource, the first action corresponding to the first action resource can be executed, that is, the closing operation can be performed on the window.

In other examples, at the time t1, the second action resource is triggered first and the second action is executed, that is, the opening operation is performed on window; at the time t2, the first action resource is triggered, the first action resource and the second action resource have the same conflict priority, and the interval between the time t1 and the time t2 is greater than the duration represented by the second conflict priority effective time attribute corresponding to the second action resource, then the first action corresponding to the first action resource can be performed, that is, the closing operation can be performed on the window.

In other examples, at the time t1, the second action resource is triggered firstly and the second action is executed, that is, the opening operation is performed on window. At the time t2, the first action resource is triggered, the first action resource and the second action resource have the same conflict priority, and the interval between the time t1 and the time t2 is less than the duration represented by the second conflict priority effective time attribute corresponding to the second action resource, and then the first action corresponding to the first action resource cannot be executed.

It should be noted that the first action resource and the second action resource of the present disclosure are not limited to the above examples, and the target resource of the first action resource and the target resource of the second action resource may both be an air conditioner, the first action may refer to setting the working temperature of the air conditioner to 25° C. and the second action may refer to setting the working temperature of the air conditioner to 18° C.

It should be noted that in some embodiments, the first action resource can also be used to trigger a predefined action (e.g., close a door) according to the first triggering condition (e.g., the concentration of PM2.5 is higher than the preset threshold A) for a target resource (e.g., a door) different from the target resource (e.g., the window). For example, in an example, the predefined action and the first action can be the same, and the closing operation can be triggered according to the first triggering condition for the window and the closing operation can be triggered according to the first triggering condition for the door; in other examples, the predefined action may be different from the first action, for example, the closing operation may be triggered according to the first triggering condition for the window and the opening operation may be triggered according to the first triggering condition for an air purifier. That is, the first action resource can include a plurality of target resources, and can perform predefined actions on one or more of the plurality of target resources under the condition that the triggering condition is met. The plurality of target resources are different, and the predefined actions corresponding to the plurality of target resources can be different, or the predefined actions corresponding to at least some of the target resources can also be the same.

For example, in some embodiments, the first action resource is a resource for triggering a closing operation (i.e., the first action includes a closing operation) for the window (i.e., the target resource), for example, in the case where it is detected that the concentration of PM2.5 in the air is higher than a preset threshold (e.g., 150), the closing operation is performed for the window. The second action resource is a resource for triggering an opening operation (that is, the second action includes the opening operation) for the window, for example, in the case where it is detected that the concentration of carbon monoxide in the air is higher than a preset threshold (for example, 20%), the opening operation is performed for the window. Table 1 below shows various attribute values of the first action resource in an example of the embodiment, and Table 2 below shows various attribute values of the second action resource in an example of this embodiment.

TABLE 1

| | | Action 1 | | |
|---|---|---|---|---|
| Attribute value 1 | actionSubjectResource | address of <container4 (air quality monitoring sensor data container resource)> | | |
| Attribute value 2 | SubjectResourceID | identification code (ID) of <container4 (air quality monitoring sensor data container resource) | | |
| Attribute value 3 | evalCriteria | subject | 'Container4.content' | Concentration of PM2.5 |
| | | operator | 'greater than' | greater than |
| | | threshold | '150' | 150 |
| Attribute value 4 | evalMode | 'periodic' | | |
| Attribute value 5 | evalControlParam | '5 s' monitoring period | | |
| Attribute value 6 | objectResourceID | ID of <container2> (target resource: window switch) | | |
| Attribute value 7 | actionPrimitive | to | the resource address corresponding to the window switch resource (objectResourceID) | resource address |
| | | resource type | the resource type corresponding to the window switch resource (objectResourceID) | resource type |
| | | content | the content of the input data package | the content data of the closing command (string) data package |
| | | op | Update | representing an update operation |
| | | etc. | | |
| Attribute value 8 | input | closing command (string) | | |
| Attribute value 9 | outputResourceID | ID of <container3 (window controller container resource)> | | |
| Attribute value 10 | actionResult | status value (action result) | | |
| Attribute value 11 | conflictPriority | '4' (conflict priority of the action) | | |
| Attribute value 12 | conflictSafeTime | '1 h' (the conflict priority effective duration of the action) | | |

For example, Table 1 shows 12 attribute values of the first action resource. In Table 1, the attribute value 8 is the same as the data packaged in the content in the attribute value 7. For example, the attribute value 8 can also be expressed as resourceID (identification code of the resource) or the URI (universal resource identifier) of a resource attribute, and the like.

TABLE 2

| | | Action2 | | |
|---|---|---|---|---|
| Attribute value 1 | actionSubjectResource | address of <container1 (Carbon monoxide sensor data container resource)> | | |
| Attribute value 2 | SubjectResourceID | identification code (ID) of <container1 (Carbon monoxide sensor data container resource) | | |
| Attribute value 3 | evalCriteria | subject | 'Container1.content' | Concentration of carbon monoxide |
| | | operator | 'greater than' | greater than |
| | | threshold | '50 ppm' | 50 ppm |

TABLE 2-continued

| | | Action2 | |
|---|---|---|---|
| Attribute value 4 | evalMode | 'periodic' | |
| Attribute value 5 | evalControlParam | '5 s' monitoring period | |
| Attribute value 6 | objectResourceID | ID of <container2> (target resource: window switch) | |
| Attribute value 7 | actionPrimitive | to — the resource address corresponding to the window switch source (objectResourceID) | resource address |
| | | resource type — the resource type corresponding to the window switch source (objectResourceID) | resource type |
| | | content — the content of the input data package | the content data of the opening command (string) data package |
| | | op — Update | data package representing an update operation |
| | | etc. | |
| Attribute value 8 | input | Opening command (string) | |
| Attribute value 9 | outputResourceID | ID of <container3 (window controller container resource)> | |
| Attribute value 10 | actionResult | Status value (action result) | |
| Attribute value 11 | conflictPriority | '1' (conflict priority of the action) | |
| Attribute value 12 | conflictSafeTime | '72 h' (the conflict priority effective duration of the action) | |

For example, Table 2 shows 12 attribute values of the second action resource. In Table 2, the attribute value 8 is the same as the data packaged in the content in the attribute value 7. For example, the attribute value 8 can also be expressed as resourceID (identification code of the resource) or the URI (universal resource identifier) of a resource attribute, and the like.

For example, as can be seen from Table 1 and Table 2 above, the attribute value of the first conflict priority attribute of the first action resource is 4, the attribute value of the first conflict priority effective time attribute is 1 hour (h), the attribute value of the second conflict priority attribute of the second action resource is 1, and the attribute value of the second conflict priority effective time attribute is 72 h, that is, the conflict priority of the first action resource is lower than the conflict priority of the second action resource.

As shown in FIG. 5, at the time t2, the first action resource is triggered, and the common service entity searches for the action resource that conflicts with the first action resource based on the target resource and the first action of the first action resource. If the common service entity finds the second action resource that conflicts with the first action resource, the conflict priority of the second action resource is higher than the conflict priority of the first action resource, and at the time t1, the second action resource is triggered and the second action is executed, then the common service entity judges the occupation time of the second action resource for the target resource, if the interval between the time t1 and the time t2 is less than the duration (for example, 72 h) represented by the second conflict priority effective time attribute corresponding to the second action resource, the action corresponding to the first action resource cannot be triggered to be executed. If the interval between the time t1 and the time t2 is greater than the duration represented by the second conflict priority effective time attribute corresponding to the second action resource, the first action corresponding to the first action resource can be executed.

It should be noted that "the occupation time of the second action resource for the target resource" can represent the duration after the second action resource is triggered and the second action is executed.

For example, in some embodiments, creating the first action resource further comprises creating a first conflict target resource attribute and a first conflict target action attribute for the first action resource.

For example, in some examples, the first action resource includes the first conflict target resource attribute, the first conflict target action attribute, and at least one selected from the group consisting of the first conflict priority attribute and the first conflict priority effective time attribute. For example, the first action resource includes the first conflict priority attribute, the first conflict target resource attribute, and the first conflict target action attribute; or, the first action resource includes the first conflict priority effective time attribute, the first conflict target resource attribute, and the first conflict target action attribute; or, the first action resource includes the first conflict priority attribute, the first conflict priority effective time attribute, the first conflict target resource attribute, and the first conflict target action attribute. That is, the first conflict priority attribute, the first conflict priority effective time attribute, the first conflict target resource attribute, and the first conflict target action attribute are all under the first action resource.

Figure 6A:
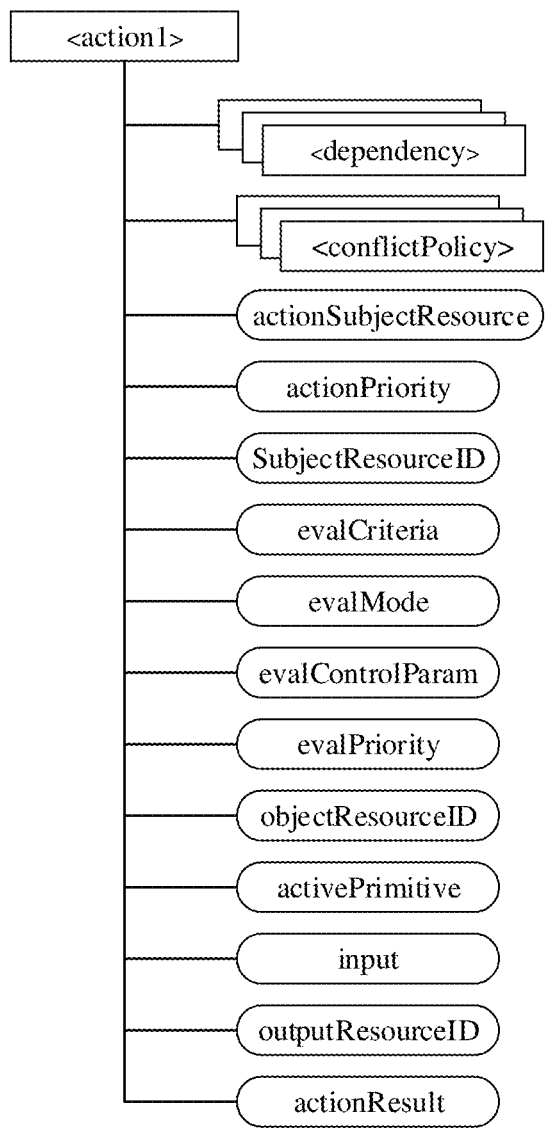
FIG. 6A shows a schematic diagram of another first action resource provided by some embodiments of the present disclosure.
Figure 6B:
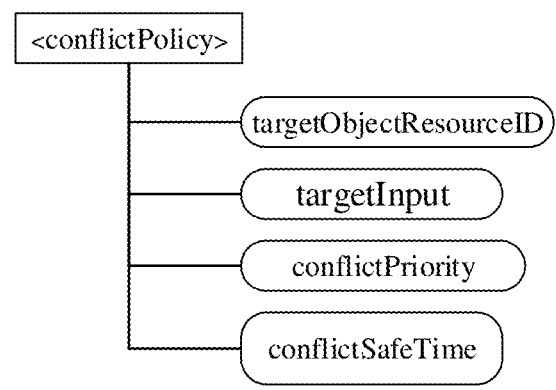
FIG. 6B shows a schematic diagram of a conflict policy sub-resource in a first action resource provided by some embodiments of the present disclosure.

FIG. 6A shows a schematic diagram of another first action resource provided by some embodiments of the present disclosure, and FIG. 6B shows a schematic diagram of a conflict policy sub-resource in the first action resource provided by some embodiments of the present disclosure.

For example, as shown in FIGS. 6A and 6B, in other examples, the first action resource further includes a conflict policy sub-resource (conflictPolicy). The conflict policy sub-resource includes the first conflict target resource attribute (targetObjectResourceID), the first conflict target action attribute (targetInput), and at least one selected from the group consisting of the first conflict priority attribute and the first conflict priority effective time attribute. For example, the conflict policy sub-resource includes the first conflict priority attribute, the first conflict target resource attribute, and the first conflict target action attribute; or, the conflict policy sub-resource includes the first conflict priority effective time attribute, the first conflict target resource attribute, and the first conflict target action attribute; or, as shown in FIG. 6B, the conflict policy sub-resource includes the first conflict priority attribute, the first conflict priority effective time attribute, the first conflict target resource attribute, and the first conflict target action attribute. That is, the first conflict priority attribute, the first conflict priority effective time attribute, the first conflict target resource attribute, and the first conflict target action attribute are all under the conflict policy sub-resource of the first action resource.

For example, the first conflict target resource attribute represents an identification code of the target resource of the first action resource. The first conflict target action attribute represents an action that conflicts with the first action. For example, in the case where the first action is an opening operation, the first conflict target action attribute may represent a closing operation.

It is worth noting that, as shown in FIGS. 4 and 6A, the first action resource may further include a dependency priority attribute (evalPriority) that indicates the priority of the dependency condition of the action resource, an action priority attribute (actionPriority), an action subject resource attribute (actionSubjectResource), a subject resource identification attribute (SubjectResourceID), an evaluation criteria attribute (evalCriteria), a trigger mode attribute (evalMode), a trigger mode control attribute (evalControlParam), a target identification attribute (objectResourceID), an action attribute (activePrimitive) of the action mode, an input attribute (input) of the action parameter, an output resource identification attribute (outputResourceID) of the action result, an action result attribute (actionResult), and a dependency sub-resource (<dependency>) of the dependency condition. For example, the action result is a status value. It should be noted that the dependency priority attribute of the first action resource represents a judgment order of a plurality of dependency conditions in the case where the first action resource has the plurality of dependency conditions. The dependency priority attribute of the second action resource indicates a judgment order of a plurality of dependency conditions in the case where the second action resource has the plurality of dependency conditions.

It should be noted that in the present disclosure, the plurality of attribute values of the first action resource or the second action resource can be created based on the same creation request, or can be created based on a plurality of creation requests. For example, in some examples, the remaining attributes of the first action resource except the dependency sub-resource (e.g., a first dependency sub-resource and/or a second dependency sub-resource) can be created based on the first creation request, while the dependency sub-resource of the first action resource can be created based on a third creation request sent to the common service entity; alternatively, a first action status attribute and a first action time attribute of the first action resource can be created based on the first creation request, while the remaining attributes of the first action resource except the first action status attribute and the first action time attribute can be created based on the third creation request sent to the common service entity. The present disclosure does not specifically limit the specific creation time and process of each attribute in the first action resource and the second action resource.

For example, in some embodiments, the first action resource is a resource for triggering a closing operation (i.e., the first action includes the closing operation) for a window (i.e., the target resource), for example, when it is detected that the concentration of PM2.5 in the air is higher than a preset threshold (e.g., 150), the closing operation is performed for the window. The second action resource is a resource for triggering an opening operation (that is, the second action includes the opening operation) for the window, for example, when it is detected that the concentration of carbon monoxide in the air is higher than a preset threshold (for example, 20%), the opening operation is performed for the window. For example, the second action resource may also include a conflict policy sub-resource, which includes a second conflict priority attribute, a second conflict priority effective time attribute, a second conflict target resource attribute, and a second conflict target action attribute.

Table 3 below shows various attribute values of the first action resource in an example of the embodiment, and Table 5 below shows various attribute values of the second action resource in an example of the embodiment.

TABLE 3

| | | Action 1 | | |
|---|---|---|---|---|
| conflict policy sub-resource | <conflictPolicy> | | | |
| Attribute value 1 | actionSubjectResource | address of <container4 (air quality monitoring sensor data container resource)> | | |
| Attribute value 2 | SubjectResourceID | identification code (ID) of <container4 (air quality monitoring sensor data container resource) | | |
| Attribute value 3 | evalCriteria | subject | 'Container4.content' | Concentration of PM2.5 |
| | | operator | 'greater than' | greater than |
| | | threshold | '150' | 150 |
| Attribute value 4 | evalMode | | 'periodic' | |
| Attribute value 5 | evalControlParam | | '5 s' monitoring period | |
| Attribute value 6 | objectResourceID | ID of <container2> (target resource: window switch) | | |

TABLE 3-continued

| Action 1 | | | | |
|---|---|---|---|---|
| conflict policy sub-resource | <conflictPolicy> | | | |
| Attribute value 7 | actionPrimitive | to | the resource address corresponding to the window switch resource (objectResourceID) | resource address |
| | | resource type | the resource type corresponding to the window switch resource (objectResourceID) | resource type |
| | | content | the content of the input data package | the content data of the closing command (string) data package |
| | | op | Update | representing an update operation |
| | | etc. | | |
| Attribute value 8 | input | | closing command (string) | |
| Attribute value 9 | outputResourceID | ID of <container3 (window controller container resource)> | | |
| Attribute value 10 | actionResult | status value (action result) | | |

For example, Table 3 shows 10 attribute values and the conflict policy sub-resource of the first action resource. Table 4 shows the conflict policy sub-resource of the first action resource.

TABLE 4

| Attribute value 1 | targetObjectResourceID | ID of <container2> (target resource: window switch) |
|---|---|---|
| Attribute value 2 | targetInput | closing command (string) |
| Attribute value 3 | conflictPriority | '4' |
| Attribute value 4 | conflictSafeTime | '1 h' |

For example, as shown in Table 4, the conflict policy sub-resource of the first action resource can include four attribute values, which are the first conflict priority attribute, the first conflict priority effective time attribute, the first conflict target resource attribute, and the first conflict target action attribute of the first action resource.

TABLE 5

| Action2 | | | | |
|---|---|---|---|---|
| conflict policy sub-resource | <conflictPolicy> | | | |
| Attribute value 1 | actionSubjectResource | address of <container1 (Carbon monoxide sensor data container resource)> | | |
| Attribute value 2 | SubjectResourceID | identification code (ID) of <container1 (Carbon monoxide sensor data container resource)> | | |
| Attribute value 3 | evalCriteria | subject | 'Container1.content' | Concentration of carbon monoxide |
| | | operator | 'greater than' | greater than |
| | | threshold | '50 ppm' | 50 ppm |
| Attribute value 4 | evalMode | | 'periodic' | |
| Attribute value 5 | evalControlParam | | '5 s' monitoring period | |
| Attribute value 6 | objectResourceID | ID of <container2> (target resource: window switch) | | |
| Attribute value 7 | actionPrimitive | to | the resource address corresponding to the window switch resource (objectResourceID) | resource address |
| | | resource type | the resource type corresponding to the window switch resource (objectResourceID) | resource type |

TABLE 5-continued

| | | Action2 | | |
|---|---|---|---|---|
| conflict policy sub-resource | <conflictPolicy> | | | |
| | | content | the content of the input data package | the content data of the opening command (string) data package |
| | | op | Update | representing an update operation |
| | | etc. | | |
| Attribute value 8 | input | | Opening command (string) | |
| Attribute value 9 | outputResourceID | | ID of <container3 (window controller container resource)> | |
| Attribute value 10 | actionResult | | Status value (action result) | |

For example, Table 5 shows 10 attribute values and the conflict policy sub-resource of the second action resource, and Table 6 shows the conflict policy sub-resource of the second action resource.

TABLE 6

| Attribute value 1 | targetObjectResourceID | ID of <container2> (target resource: window switch) |
|---|---|---|
| Attribute value 2 | targetInput | opening command (string) |
| Attribute value3 | conflictPriority | '1' |
| Attribute value 4 | conflictSafeTime | '72 h' |

For example, as shown in Table 6, the conflict policy sub-resource of the second action resource can include four attribute values, which are the second conflict priority attribute, the second conflict priority effective time attribute, the second conflict target resource attribute, and the second conflict target action attribute of the second action resource.

For example, in some examples, the first action resource is triggered before the second action resource, and the first action is executed, thereby performing a closing operation for the window. Then, when the second action resource is triggered, the common service entity needs to perform matching according to the conflict policy sub-resource of the second action resource. If the common service entity finds that the first action resource matches the matching rule defined by the conflict policy sub-resource of the second action resource, the common service entity can judge whether the conflict priority of the first action resource is higher than the conflict priority of the second action resource. In the case where the common service entity determines that the conflict priority of the second action resource is higher than the conflict priority of the first action resource, the second action corresponding to the second action resource can be performed, that is, an opening operation is performed on the window.

On the contrary, the second action resource is triggered before the first action resource, and the second action is executed, thereby performing the opening operation for the window. Then, when the first action resource is triggered, the common service entity needs to perform matching according to the conflict policy sub-resource of the first action resource, and if the common service entity finds that the second action resource matches the matching rule defined by the conflict policy sub-resource of the first action resource, the common service entity can judge whether the conflict priority of the first action resource is higher than the conflict priority of the second action resource. In the case where the common service entity determines that the conflict priority of the first action resource is lower than the conflict priority of the second action resource, the common service entity needs to judge the occupation duration of the second action resource for the target resource again, in this case, if the occupation duration of the second action resource for the target resource is less than the duration represented by the second conflict priority effective time attribute of the second action resource, the first action corresponding to the first action resource cannot be executed; if the occupation duration of the second action resource for the target resource is greater than or equal to the duration represented by the second conflict priority effective time attribute of the second action resource, the first action corresponding to the first action resource can be executed.

For example, in some embodiments, creating the first action resource further comprises creating a first action status attribute for the first action resource.

Figure 7:
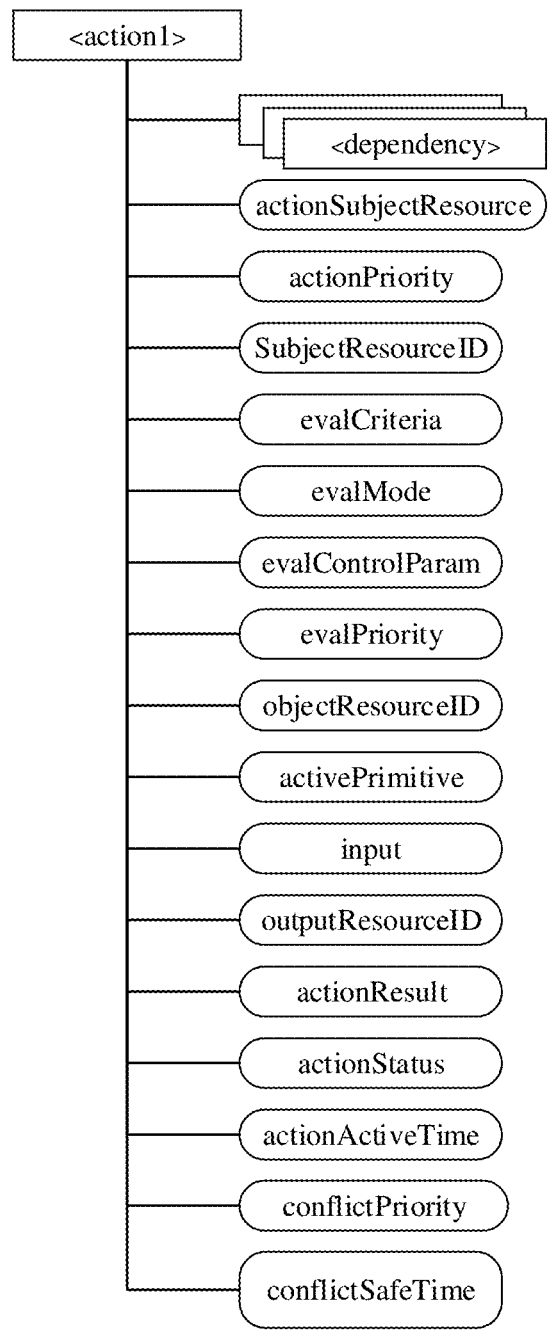
FIG. 7 shows a schematic diagram of yet another first action resource provided by some embodiments of the present disclosure.

FIG. 7 shows a schematic diagram of yet another first action resource provided by some embodiments of the present disclosure.

For example, as shown in FIG. 7, the first action resource may also include a first action status attribute (actionStatus). The first action status attribute represents the status of the first action. The first action status attribute is a status value.

For example, the attribute value of the first action status attribute includes a first set value and a second set value, and the status of the first action includes an active status or an inactive status. For example, in the case where the attribute value of the first action status attribute is the first set value, the status of the first action is active, that is, the first set value is active, which means that the first action is triggered to be executed; and in the case where the attribute value of the first action status attribute is the second set value, the status of the first action is inactive, that is, the second set value is inactive, which means that the first action is not triggered to be executed.

For example, in the case where the first action resource is created, but the first action is not triggered, the attribute value of the first action status attribute is the second set value, that is, the status of the first action is inactive; in the case where the first action resource is created and the first action is executed, the attribute value of the first action status attribute is the first set value, that is, the status of the first action is active.

For example, in the case where the first action resource is a resource for triggering the opening operation (i.e., the first action) for a window (i.e., the target resource), after the first action resource is created, but no notice is sent to the window controller to control the opening of the window, the attribute value of the first action status attribute is the second set value, and when a notice is sent to the window controller to control the opening of the window, the attribute value of the first action status attribute changes from the second set value to the first set value.

The embodiments of the present disclosure are described by taking a case that the first set value indicates that the status of the first action is active and the second set value indicates that the status of the first action is inactive as an example, but the present disclosure is not limited to this case. In some embodiments, the first set value may also indicate that the status of the first action is inactive, and correspondingly, the second set value indicates that the status of the first action is active.

For example, in some embodiments, creating the first action resource further comprises creating a first action time attribute for the first action resource. For example, the first action time attribute is used to indicate a time parameter related to the first action.

For example, as shown in FIG. 7, the first action resource also includes a first action time attribute (actionActiveTime). The first action time attribute is a status value, and the first action time attribute represents a duration elapsed after the first action has been triggered to be executed. For example, after the first action resource is created, the first action is not triggered to be executed, the attribute value of the first action time attribute is not set, or is empty or does not exist, and the attribute value of the first action time attribute has no corresponding meaning; after the first action resource is created, and when the first action is triggered to be executed, a related timer can be established, and the timing value of the timer can be used as the attribute value of the first action time attribute. It should be noted that the timing value of the timer can include a duration recorded by the timer, the start time and/or end time of the timer timing, and other values that can represent time.

For example, the time parameter related to the first action may include at least one selected from a group consisting of the duration after the first action is triggered (that is, after the first action is executed), the start time of executing the first action, and the end time of executing the first action. It should be noted that in some embodiments, the time parameter related to the first action is not necessarily the direct time, but may also be the indirect time, such as the number of the execution times.

It should be noted that the second action resource may also include a second action status attribute and a second action time attribute. In the embodiments of the present disclosure, if not explicitly stated, the embodiments of the present disclosure are described by taking a case that the first action time attribute is used to indicate the duration after the first action is performed and the second action time attribute is used to indicate the duration after the second action is performed as an example.

For example, in some embodiments, the first action resource may also include a first dependency sub-resource and/or a second dependency sub-resource for the first action resource. In this case, the first creation request may include a dependency request, the common service entity creates the first dependency sub-resource and/or the second dependency sub-resource for the first action resource according to the dependency request. For example, the first dependency sub-resource includes a first dependency condition, the first dependency condition is related to the second action status attribute of the second action resource, the second dependency sub-resource includes the second dependency condition, and the second dependency condition is related to the second action time attribute of the second action resource. For example, in this case, the first action for the target resource can be triggered in the case where at least one of the first dependency condition and the second dependency condition, and the first triggering condition are simultaneously met.

For example, in the case where the first action resource includes a plurality of dependency sub-resources, the relationship among the plurality of dependency sub-resources may be a necessary relationship or a sufficient relationship. If the relationship among the plurality of dependency sub-resources can be a sufficient relationship, in the case where any one of the plurality of dependency sub-resources is met, the first action for the target resource can be triggered; if the relationship among the plurality of dependency sub-resources can be a necessary relationship, the first action for the target resource can be triggered only in the case where the plurality of dependency sub-resources all are met. For example, in an embodiment, the first action resource includes a first dependency sub-resource and a second dependency sub-resource. If the first dependency sub-resource and the second dependency sub-resource have a sufficient relationship, the first dependency sub-resource is verified first in the case where the first triggering condition is met, if the verification of the first dependency sub-resource passes, the first action for the target resource can be triggered without passing the verification of the second dependency sub-resource; if the verification of the first dependency sub-resource fails, then the second dependency sub-resource is verified, if the verification of the second dependency sub-resource passes, the first action for the target resource can be triggered, and if the verification of the second dependency sub-resource fails, the first action for the target resource cannot be triggered. If the first dependency sub-resource and the second dependency sub-resource have a necessary relationship, in the case where the first triggering condition is satisfied, the first dependency sub-resource is firstly verified, if the verification of the first dependency sub-resource passes, the second dependency sub-resource is verified, and if the verification of the second dependency sub-resource passes, then the first action for the target resource can be triggered; if the verification of any one of the first dependency sub-resource or the second dependency sub-resource fails, the first action for the target resource cannot be triggered.

For example, in the case where the first action resource includes the first dependency sub-resource and the second dependency sub-resource, and the first dependency sub-resource and the second dependency sub-resource have a sufficient relationship, in the case where the first triggering condition is met, the common service entity can firstly determine whether the first dependency condition in the first dependency sub-resource is met according to the second action status attribute, and in the case where the second action status attribute meets the first dependency condition, the first action can be triggered for the target resource; and in the case where the second action status attribute does not meet the first dependency condition, it is judged according to the second action time attribute whether the second dependency condition in the second dependency sub-resource is met, and in the case where the second action time attribute meets the second dependency condition, the first action can be triggered for the target resource. In the case where the second action status attribute does not meet the first dependency condition and the second action time attribute does not meet the second dependency condition, the first action may not be triggered.

For example, the first dependency condition includes that the attribute value of the second action status attribute and the first set value meet a first preset logical relationship, and the first set value is active or inactive. The second dependence condition includes that the second action time attribute and the preset action time meet a second preset logical relationship.

For example, in some examples, for the status, the first preset logical relationship may include equal or not equal, that is, the first preset logical relationship may indicate that the attribute value of the second action status attribute is equal to the first set value, or the attribute value of the second action status attribute is not equal to the first set value. If the first set value is active, the first preset logical relationship can indicate that the attribute value of the second action status attribute is equal to active or the attribute value of the second action status attribute is not equal to active; if the first set value is inactive, the first preset logical relationship can indicate that the attribute value of the second action status attribute is equal to inactive or the attribute value of the second action status attribute is not equal to inactive.

For example, in some examples, for the time, the second preset logical relationship may include equal to, not equal to, greater than, less than, greater than or equal to, less than or equal to, longer than, shorter than, longer than or equal to, shorter than or equal to, etc. For example, in some examples, if the second action time attribute indicates the duration after the second action is triggered, and the preset action time represents the time range in which the second action resource has exclusive access to the target resource after the second action is executed, in this case, the second preset logical relationship can indicate that the attribute value of the second action time attribute is greater than, or greater than or equal to, or longer than or equal to, or longer than the preset action time. For example, in other examples, if the second action time attribute represents the remaining duration in which the second action resource has exclusive access to the target resource after the second action is executed, the preset action time may be 0, in this case, the second preset logical relationship may represent that the attribute value of the second action time attribute is equal to the preset action time.

For example, the preset action time can be preset according to the actual application requirements, for example, the preset action time can be 0, 5 minutes, 72 hours, etc.

For example, each dependency sub-resource of the first action resource may include at least one dependency condition. For example, in some embodiments, the first action resource may only include one dependency sub-resource, the dependency sub-resource includes two dependency conditions, the two dependency conditions are respectively a condition that the attribute value of the second action status attribute is not equal to the first set value and a condition that the second action time attribute is greater than the preset action time.

It should be noted that the second action resource may also include one or more dependency sub-resources, and each dependency sub-resource includes one or more dependency conditions. The dependency sub-resource of the second action resource can be related to the first action resource or other action resources, and the present disclosure does not limit this.

For example, in some embodiments, the first action resource further includes a first reverse action attribute (reverseAction) and a first status control attribute (statusControl); the second action resource also includes a second reverse action attribute (reverseAction) and a second status control attribute (statusControl). By setting the first reverse action attribute, the first status control attribute, the second reverse action attribute, and the second status control attribute, it can be ensured that the attribute value of the first action status attribute and the attribute value of the second action status attribute are opposite to each other at any moment (except an initial moment).

For example, in some embodiments, under the condition that the temperature is greater than 27 degrees Celsius, the action of turning on the air conditioner for refrigeration can be triggered for the air conditioner, and under the condition that the temperature is less than 23 degrees Celsius, the action of turning off the air conditioner for refrigeration can be triggered for the air conditioner. The first action resource can be deployed on the common service entity: when it is detected that the temperature is greater than 27 degrees Celsius, the action of turning on the air conditioner for refrigeration is performed on the air conditioner. The second action resource can also be deployed on the common service entity: when it is detected that the temperature is less than 23 degrees Celsius, the action of turning off the air conditioner for refrigeration is performed on the air conditioner. That is, the first action is to turn on the air conditioner for refrigeration, and the second action is to turn off the air conditioner for refrigeration, namely the first action and the second action are opposite to each other. In this case, the first reverse action attribute represents the identification code of the second action resource, and the second reverse action attribute represents the identification code of the first action resource, that is, in this case, the first action corresponding to the first action resource and the second action corresponding to the second action resource are mutually opposite actions. The first status control attribute indicates whether to change the attribute value of the second action status attribute according to the attribute value of the first action status attribute, and the second status control attribute indicates whether to change the attribute value of the first action status attribute according to the attribute value of the second action status attribute.

For example, the attribute value of the first status control attribute may include true or false, and the attribute value of the second status control attribute may also include true or false. When the attribute value of the first status control attribute is true, it means that the attribute value of the second action status attribute can be changed according to the attribute value of the first action status attribute; when the attribute value of the second status control attribute is true, it means that the attribute value of the first action status attribute can be changed according to the attribute value of the second action status attribute. When the attribute value of the first status control attribute is false, it means that the attribute value of the second action status attribute cannot be changed according to the attribute value of the first action status attribute; when the attribute value of the second status control attribute is false, it means that the attribute value of the first action status attribute cannot be changed according to the attribute value of the second action status attribute.

For example, in some examples, the attribute value of the first status control attribute is true, and the attribute value of the second status control attribute is also true. When both the first action resource and the second action resource are created, at the initial moment, the attribute value of the first action status attribute of the first action resource is the second set value (namely, inactive), and the attribute value of the second action status attribute of the second action resource is the second set value (namely, inactive); when the second action is triggered at the time t1, the attribute value of the second action status attribute of the second action resource changes from the second set value (namely, inactive) to the first set value (namely, active). At this time, because the attribute value of the second action status attribute is the first set value, and the attribute value of the first action status attribute and the attribute value of the second action status attribute need to be mutually exclusive, the attribute value of the first action status attribute of the first action resource is the second set value (actually, it has not changed). At the time t2, after the first action is triggered, the attribute value of the first action status attribute of the first action resource changes from the second set value to the first set value. At this time, because the attribute value of the second action status attribute is the first set value, and the attribute value of the first action status attribute and the attribute value of the second action status attribute need to be mutually exclusive, the attribute value of the second action status attribute of the second action resource changes from the first set value to the second set value to ensure that the attribute value of the first action status attribute and the attribute value of the second action status attribute are opposite to each other. The above process is repeatedly performed, so that the attribute value of the first action status attribute changes alternately between the first set value and the second set value at the subsequent time, and correspondingly, the attribute value of the second action status attribute changes alternately between the second set value and the first set value.

For example, in some embodiments, the first action resource also includes a first status auto control time attribute (StatusAutoControl), and the second action resource also includes a second status auto control time attribute (StatusAutoControl).

Taking the first action resource as an example, the attribute value of the first action status attribute includes a first set value and a second set value, and the first set value and the second set value are opposite to each other.

For example, in some examples, the first status auto control time may indicate that the attribute value of the first action status attribute is changed from the first set value to the second set value based on the attribute value of the first action status attribute being the first set value and the attribute value of the first action time attribute being greater than or equal to the attribute value of the first status auto control time attribute. For example, when the first action is triggered, the attribute value of the first action status attribute is set to the first set value, and when the duration after the first action is executed is greater than or equal to the attribute value of the first status auto control time attribute, the attribute value of the first action status attribute can be changed from the first set value to the second set value.

For example, in other examples, the first status auto control time can also indicate that the attribute value of the first action status attribute is changed from the first set value to the second set value based on the attribute value of the first action status attribute being the first set value and the attribute value of the first status auto control time attribute being equal to 0. For example, when the first action is triggered, the attribute value of the first action status attribute is set to the first set value, and at this time, the countdown is started based on the attribute value of the first state auto control time attribute, when the attribute value of the first state auto control time attribute is equal to 0, it means that the duration after the first action is executed is equal to the attribute value of the first state auto control time attribute, so that the attribute value of the first action status attribute can be changed from the first set value to the second set value.

For example, in some embodiments, the first creation request also includes conflict policy resource information. For example, creating the first action resource further includes creating a preset conflict policy sub-resource for the first action resource based on the conflict policy resource information.

For example, in the case that the first action resource includes a conflict policy sub-resource, creating the first action resource may further include creating the first dependency sub-resource and/or the second dependency sub-resource for the first action resource based on the fact that the target resource, the second action, and the preset conflict policy sub-resource of the second action resource meet the matching condition. For example, the first dependency sub-resource includes the first dependency condition, the first dependency condition is related to the second action status attribute, and the second dependency sub-resource includes the second dependency condition, and the second dependency condition is related to the second action time attribute.

For example, the first action resource also includes a preset conflict policy sub-resource. Creating the preset conflict policy sub-resource for the first action resource includes creating a conflict target resource identification attribute and a conflict execution method attribute for the first action resource.

For example, the preset conflict policy sub-resource include a conflict target resource identification attribute (conflictObjectResourceID) and a conflict execution method attribute (conflictInput). For example, the conflict target resource identification attribute represents the identification code of the target resource of the first action resource, and the conflict execution method attribute represents the action that conflicts with the first action.

For example, meeting the matching condition includes: the identification code of the target resource of the second action resource is the same as the conflict target resource identification attribute, and the second action is the same as the action indicated by the conflict execution method attribute.

For example, in some embodiments, creating the preset conflict policy sub-resource for the first action resource further comprises creating a conflict status attribute for the first action resource.

For example, the preset conflict policy sub-resource includes a conflict status attribute (conflictStatus), and the attribute value of the conflict status attribute may include the first set value and the second set value. For example, if the target resource of the first action resource and the target resource of the second action resource are the same target resource, and the first action and the second action conflict with each other, it means that the target resource, the second action, and the preset conflict policy sub-resource of the second action resource meet the matching condition, in this case, if the attribute value of the conflict status attribute is set to the first set value, it means that the first action cannot be triggered when the attribute value of the second action status attribute is the first set value, and the first action can be triggered when the attribute value of the second action status attribute is the second set value. On the contrary, if the attribute value of the conflict status attribute is set to the second set value, it means that the first action cannot be triggered when the attribute value of the second action status attribute is set to the second set value, and the first action can be triggered when the attribute value of the second action status attribute is set to the first set value.

For example, when the attribute value of the conflict status attribute is the first set value, the first dependency condition includes that the attribute value of the second action status attribute is not equal to the first set value, or the first dependency condition includes that the attribute value of the second action status attribute is equal to the second set value, and the first set value is active or inactive; when the attribute value of the conflict status attribute is the second set value, the first dependency condition includes that the attribute value of the second action status attribute is not equal to the second set value, or the first dependency condition includes that the attribute value of the second action status attribute is equal to the first set value. The second dependency condition includes that the second action time attribute is greater than the preset action time.

It should be noted that in the present disclosure, in the case of no conflict, the description for the first action resource is applicable to the second action resource. That is, for example, the second action resource may also include a status auto control time attribute; the second action resource may also include a preset conflict policy sub-resource, etc.

Figure 8:
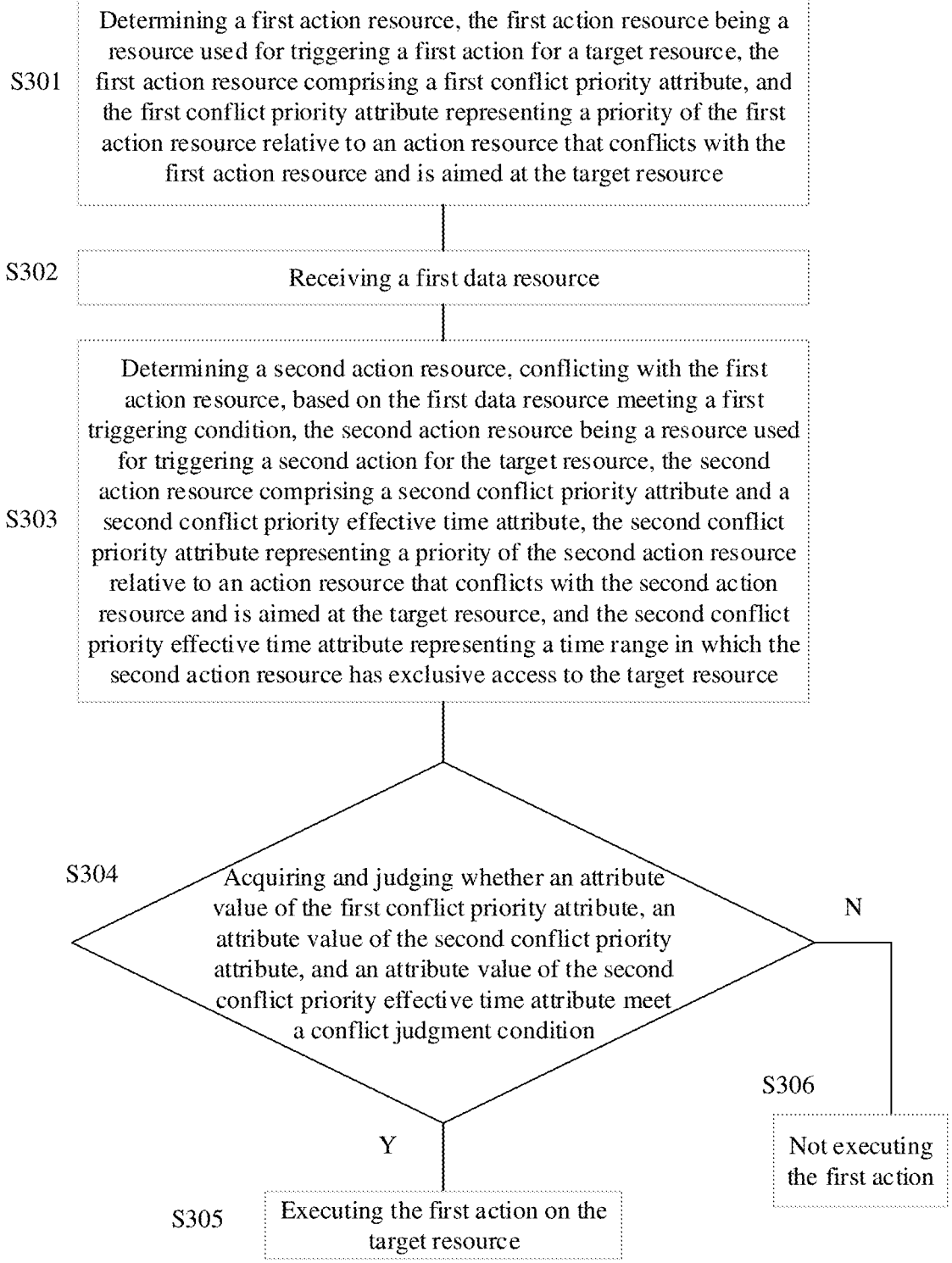
FIG. 8 shows a schematic diagram of an execution method of an action provided by some embodiments of the present disclosure.

Some embodiments of the present disclosure provide an execution method of an action. FIG. 8 shows a schematic diagram of an execution method of an action provided by some embodiments of the present disclosure.

For example, as shown in FIG. 8, in some embodiments, the execution method of the action may include:

S301: determining a first action resource, the first action resource being a resource used for triggering a first action for a target resource, the first action resource comprising a first conflict priority attribute, and the first conflict priority attribute representing a priority of the first action resource relative to an action resource that conflicts with the first action resource and is aimed at the target resource;

S302: receiving a first data resource;

S303: determining a second action resource, conflicting with the first action resource, based on the first data resource meeting a first triggering condition, the second action resource being a resource used for triggering a second action for the target resource, the second action resource comprising a second conflict priority attribute and a second conflict priority effective time attribute, the second conflict priority attribute representing a priority of the second action resource relative to an action resource that conflicts with the second action resource and is aimed at the target resource, and the second conflict priority effective time attribute representing a time range in which the second action resource has exclusive access to the target resource;

S304: acquiring and judging whether an attribute value of the first conflict priority attribute, an attribute value of the second conflict priority attribute, and an attribute value of the second conflict priority effective time attribute meet a conflict judgment condition, if the conflict judgment condition is met, performing step S305: executing the first action on the target resource; if the conflict judgment condition is not met, performing step S306: not executing the first action.

According to the execution method of an action provided by the present disclosure, the conflict problem of the action resources can be solved by adding the conflict priority attribute and the conflict priority effective time attribute to the action resource, and the execution efficiency of the action is improved.

It should be noted that, in the present disclosure, the execution order of the above steps is not limited, and the above steps can be executed in any non-conflicting order.

For example, in some examples, "determining the second action resource conflicting with the first action resource" can be executed before step S301 or simultaneously with step S301, and the present disclosure does not limit this. The number of the action resources that conflict with the first action resource may be one or more, that is, in the present disclosure, in step S303, the number of the second action resources may be more than one.

The present disclosure is not limited to the execution method as shown in FIG. 8. For example, in other embodiments, the execution method of the action includes: determining a first action resource, where the first action resource is a resource used for triggering a first action for a target resource, the first action resource comprises a first conflict priority attribute, and the first conflict priority attribute represents a priority of the first action resource relative to an action resource which conflicts with the first action resource and is aimed at the target resource; receiving a first data resource; determining a second action resource, which conflicts with the first action resource, based on the first data resource meeting a first triggering condition, where the second action resource is a resource used for triggering a second action for the target resource, the second action resource comprises a second conflict priority attribute, and the second conflict priority attribute represents a priority of the second action resource relative to an action resource which conflicts with the second action resource and is aimed at the target resource; acquiring and judging whether an attribute value of the first conflict priority attribute and an attribute value of the second conflict priority attribute meet a conflict judgment condition, if the conflict judgment condition is met, executing the first action on the target resource; if the conflict judgment condition is not met, not executing the first action. That is, in the present disclosure, neither the first action resource nor the second action resource may set the conflict priority effective time attribute, in a case where the attribute value of the first conflict priority attribute takes precedence over the attribute value of the second conflict priority attribute, the first action is executed on the target resource; in a case where the attribute value of the first conflict priority attribute does not take precedence over the attribute value of the second conflict priority attribute, the first action is not executed.

For example, the first action resource and the second action resource are action resources for the same target resource.

For example, in some embodiments, the sensing data can be received by various sensors to determine the first data resource (also referred to as the first subject resource). For example, the first data resource can be a concentration of carbon monoxide, a concentration of PM2.5, a temperature, etc. For example, in the use environment of the smart home, the sensor data can be received through sensors, such as a carbon monoxide sensor, a rainfall sensor, and an air quality monitoring sensor, etc., and the first data resource can be updated with the received sensor data. The first action corresponding to the first action resource represents that when it is detected that the concentration of PM2.5 in the air is higher than a preset threshold A (for example, 100), the closing operation is performed on the window to close the window. At this time, the first data resource is the concentration of PM2.5 detected by the air quality monitoring sensor, and if the concentration of PM2.5 is higher than 100, the closing operation can be performed on the window.

For example, the application entity (e.g., a sensor) may transmit data to the common service entity to update the first data resource. This update can be real-time or periodic, or it can be triggered by a certain condition; for example, when the data detected by the application entity reaches a certain threshold, the data exceeding the threshold can be transmitted to the common service entity for updating, or when another application entity requests to acquire the first data resource, the update can be performed.

For example, the second action is different from the first action, that is, the second action can be any other action different from the first action. For example, in some examples, the first action and the second action conflict with each other. For example, the first action can mean setting the working temperature of the air conditioner to 25° C. and the second action can mean setting the working temperature of the air conditioner to 18° C. For example, in an example, the first action and the second action are opposite to each other. For example, in the case where the first action is to performing an opening operation on the target resource (such as opening the window and opening the purifier), the second action can be to performing a closing operation on the target resource (such as closing the window and closing the purifier).

For example, meeting the conflict judgment condition includes: the attribute value of the first conflict priority attribute has priority over the attribute value of the second conflict priority attribute; or, the occupation duration of the second action resource for the target resource is greater than the attribute value of the second conflict priority effective time attribute; or, the attribute value of the first conflict priority attribute has priority over the attribute value of the second conflict priority attribute, and the occupation duration of the second action resource for the target resource is greater than the attribute value of the second conflict priority effective time attribute. That is, the conflict judgment condition is met when any one selected from a group consisting of a case that the attribute value of the first conflict priority attribute is prior to the attribute value of the second conflict priority attribute and a case that the occupation duration of the second action resource for the target resource is greater than the attribute value of the second conflict priority effective time attribute is met.

For example, in step S304, judging whether the attribute value of the first conflict priority attribute, the attribute value of the second conflict priority attribute, and the attribute value of the second conflict priority effective time attribute meet the conflict judgment condition comprises: judging whether the attribute value of the first conflict priority attribute has priority over the attribute value of the second conflict priority attribute, and in a case where the attribute value of the first conflict priority attribute has priority over the attribute value of the second conflict priority attribute, determining that the conflict judgment condition is met; and in a case where the attribute value of the first conflict priority attribute does not have priority over the attribute value of the second conflict priority attribute, acquiring the occupation duration of the second action resource for the target resource, and judging whether the occupation duration of the second action resource for the target resource is greater than the attribute value of the second conflict priority effective time attribute, in a case where the occupation duration of the second action resource for the target resource is greater than or equal to the attribute value of the second conflict priority effective time attribute, determining that the conflict judgment condition is met; and in a case where the occupation duration of the second action resource for the target resource is less than the attribute value of the second conflict priority effective time attribute, determining that the conflict judgment condition is not met.

For example, in the embodiment of action resources as shown in Tables 1 and 2 above, the attribute value of the first conflict priority attribute of the first action resource is 4 and the attribute value of the second conflict priority attribute of the second action resource is 1, then in this embodiment, the attribute value of the first conflict priority attribute does not take precedence over the attribute value of the second conflict priority attribute. In this case, it is necessary to judge whether the occupation duration of the second action resource for the target resource is greater than the attribute value of the second conflict priority effective time attribute. In the case where the occupation duration of the second action resource for the target resource is greater than or equal to the attribute value of the second conflict priority effective time attribute, it is determined that the conflict judgment condition is met; in the case where the occupation duration of the second action resource for the target resource is less than the attribute value of the second conflict priority effective time attribute, it is determined that the conflict judgment condition is not met.

For example, in other embodiments, if the attribute value of the first conflict priority attribute of the first action resource is 2 and the attribute value of the second conflict priority attribute of the second action resource is 5, then in this embodiment, the attribute value of the first conflict priority attribute takes precedence over the attribute value of the second conflict priority attribute, in this case, it can be determined that the conflict judgment condition is met.

For example, in some embodiments, the second action resource further includes a second action time attribute, and the second action time attribute is used to indicate a time parameter related to the second action. In this case, acquiring the occupation duration of the second action resource for the target resource includes acquiring an attribute value of the second action time attribute as the occupation duration of the second action resource for the target resource.

For example, in step S303, determining the second action resource that conflicts with the first action resource includes: determining a candidate action resource list according to the target resource and the first action, where a candidate target resource corresponding to each candidate action resource in the candidate action resource list is identical to the target resource, and a candidate action of each candidate action resource conflicts with the first action; selecting at least one candidate action resource from the candidate action resource list; acquiring an execution status of the at least one candidate action resource; and in a case of determining that the execution status of the at least one candidate action resource is already executed, taking the at least one candidate action resource as the second action resource.

For example, the candidate action resource in the candidate action resource list can be determined based on the target resource of the first action resource and the first action. For example, in an action resource list deployed on the common service entity, the common service entity can obtain the target resource of a certain action resource, the action corresponding to the certain action resource, the target resource of the first action resource, and the first action, and can judge whether the target resource of the certain action resource is the same as the target resource of the first action resource and whether the action corresponding to the certain action resource conflicts with the first action; if the target resource of the certain action resource is the same as the target resource of the first action resource and the action corresponding to the certain action resource conflicts with the first action, the certain action resource can be taken as a candidate action resource, thereby acquiring the candidate action resource list.

For example, the first action resource includes a conflict policy sub-resource, the conflict policy sub-resource comprises the first conflict priority attribute, a first conflict priority effective time attribute, a first conflict target resource attribute, and a first conflict target action attribute. The first conflict priority effective time attribute represents a time range in which the first action resource has exclusive access to the target resource, the first conflict target resource attribute represents an identification code of the target resource, and the first conflict target action attribute represents an action which conflicts with the first action.

For example, determining the second action resource which conflicts with the first action resource comprises: acquiring the first conflict target resource attribute and the first conflict target action attribute, and determining a candidate action resource list according to the first conflict target resource attribute and the first conflict target action attribute, where an identification code of a candidate target resource corresponding to each candidate action resource in the candidate action resource list is identical to the first conflict target resource attribute, and a candidate action of each candidate action resource is identical to the first conflict target action attribute; selecting at least one candidate action resource from the candidate action resource list; acquiring an execution status of the at least one candidate action resource; in a case of determining that the execution status of the at least one candidate action resource is already executed, taking the at least one candidate action resource as the second action resource.

For example, in some embodiments, in the action resource list deployed on the common service entity, the common service entity can acquire the identification code of the target resource of a certain action resource, the action corresponding to the certain action resource, the first conflict target resource attribute, and the first conflict target action attribute, and can judge whether the identification code of the target resource of the certain action resource is the same as the first conflict target resource attribute and judge whether the action corresponding to the certain action resource conflicts with the action indicated by the first conflict target action attribute; if the identification code of the target resource of the certain action resource is the same as the first conflict target resource attribute and the action corresponding to the certain action resource conflicts with the action indicated by the first conflict target action attribute, then the certain action resource can be taken as a candidate action resource, thereby acquiring the candidate action resource list.

It should be noted that in the case where the first action resource includes the first conflict target resource attribute and the first conflict target action attribute, in the process of determining the second action resource, the common service entity can directly acquire the first conflict target resource attribute and the first conflict target action attribute, and determine the second action resource based on the first conflict target resource attribute and the first conflict target action attribute, thereby reducing the workload of the common service entity.

For example, the execution status of the at least one candidate action resource includes executed and not executed. In some embodiments, the common service entity can directly determine the execution status of the at least one candidate action resource.

For example, in other embodiments, each candidate action resource includes an action status attribute, and the action status attribute indicates the status of the action corresponding to the candidate action resource. Acquiring the execution status of the at least one candidate action resource comprises: acquiring an attribute value of an action status attribute of the at least one candidate action resource as the execution status of the at least one candidate action resource. For example, the attribute value of the action status attribute can include an active value and an inactive value. In the case where the attribute value of the action status attribute is active, it means that the execution status of the candidate action resource is executed. In the case where the attribute value of the action status attribute is inactive, it means that the execution status of the candidate action resource is not executed.

For example, in some embodiments, the first action resource further includes a first action status attribute and a first action time attribute, and the execution method of the action may further include setting the attribute value of the first action status attribute to a first set value and setting the attribute value of the first action time attribute after the first action is executed.

For example, setting the attribute value of the first action time attribute includes: after the first action is executed, establishing an action execution timer to start timing, and taking a time value of the action execution timer as the attribute value of the first action time attribute. For example, the action execution timer starts timing from 0 every time.

For example, in some embodiments, the first action resource also includes a first status auto control time attribute.

For example, in some examples, the first status auto control time may indicate that the attribute value of the first action status attribute is changed from the first set value to the second set value based on the attribute value of the first action status attribute being the first set value and the attribute value of the first action time attribute being greater than or equal to the attribute value of the first status auto control time attribute. For example, after the first action is executed, the execution method further includes: obtaining the attribute value of the first action time attribute; judging whether the attribute value of the first action time attribute is greater than or equal to the attribute value of the first status auto control time attribute, and when the attribute value of the first action time attribute is greater than or equal to the attribute value of the first status auto control time attribute, changing the attribute value of the first action status attribute from the first set value to the second set value.

For example, in other examples, the first status auto control time can also indicate that the attribute value of the first action status attribute is changed from the first set value to the second set value based on the attribute value of the first action status attribute being the first set value and the attribute value of the first status auto control time attribute being equal to 0. For example, after executing the first action, the execution method further includes: starting the countdown based on the attribute value of the first status auto control time attribute; acquiring the attribute value of the first status auto control time attribute; judging whether the attribute value of the first status auto control time attribute is equal to 0, and when the attribute value of the first status auto control time attribute is equal to 0, changing the attribute value of the first action status attribute from the first set value to the second set value.

For example, the first set value and the second set value are opposite to each other. In some examples, the first set value may be active, and correspondingly, the second set value may be inactive.

For example, in some examples, the first action resource also includes a first dependency sub-resource and a second dependency sub-resource, the first dependency sub-resource includes a first dependency condition and the second dependency sub-resource includes a second dependency condition. After determining the second action resource and before executing the first action, the execution method may further include: obtaining the second action status attribute and the second action time attribute of the second action resource, where the second action resource includes the second action status attribute and the second action time attribute, the second action status attribute represents the status of the second action, and the second action time attribute is used for indicating a time parameter related to the second action; triggering the first action for the target resource based on the fact that the first data resource meets the first triggering condition and the attribute value of the second action status attribute meets the first dependency condition and/or the attribute value of the second action time attribute meets the second dependency condition. That is, in the case where the first action resource includes the first dependency sub-resource and the second dependency sub-resource, when the first data resource meets the first triggering condition, the conflict judgment condition is met, and any one selected from a group consisting of a case that the attribute value of the second action status attribute meets the first dependency condition and a case that the attribute value of the second action time attribute meets the second dependency condition, the first action can be triggered for the target resource.

For example, the first dependency condition includes that the attribute value of the second action status attribute is not equal to the first set value, and the first set value is active or inactive. The second dependency condition includes that the second action time attribute is greater than the preset action time.

For example, in an embodiment, the first action resource further comprises a first reverse action attribute and a first status control attribute, the second action resource further comprises a second reverse action attribute and a second status control attribute, and the first reverse action attribute represents the identification code of the second action resource and the second reverse action attribute represents the identification code of the first action resource. The execution method may further include: after executing the first action, judging whether the attribute value of the first status control attribute is true or not, and setting the attribute value of the second action status attribute to a second set value in the case where it is determined that the attribute value of the first state control attribute is true, where the first set value and the second set value are opposite to each other; receiving a second data resource; based on the second data resource meeting the second triggering condition, triggering the second action for the target resource, after executing the second action, changing the attribute value of the second action status attribute from the second set value to the first set value; judging whether the attribute value of the second status control attribute is true or not, and changing the attribute value of the first action status attribute from the first set value to the second set value in a case where it is determined that the attribute value of the second status control attribute is true. In this embodiment, the first action and the second action are opposite to each other, for example, if the first action is an opening operation, the second action is a closing operation.

For example, the execution method further includes: in the case where it is determined that the attribute value of the first status control attribute is not true, not performing the operation of setting the attribute value of the second action status attribute to the second set value; in the case where it is determined that the attribute value of the second status control attribute is not true, not performing the operation of changing the attribute value of the first action status attribute from the first set value to the second set value. That is, in the present disclosure, only when the attribute value of the first status control attribute is true, can the attribute value of the second action status attribute be operated after the first action is executed, and only when the attribute value of the second status control attribute is true, can the attribute value of the first action status attribute be operated after the second action is executed. That is, after the first action is executed, it is necessary to judge whether the attribute value of the first status control attribute is true or not, the attribute value of the first status control attribute is true, the attribute value of the second action status attribute needs to be changed to the second set value (at this time, the attribute value of the first action status attribute is the first set value). If the attribute value of the first status control attribute is not true (that is, false), it is not necessary to change the attribute value of the second action status attribute. After executing the second action, it is necessary to judge whether the attribute value of the second status control attribute is true, if the attribute value of the second status control attribute is true, the attribute value of the first action status attribute needs to be changed to the second set value (at this time, the attribute value of the second action status attribute is the first set value). If the attribute value of the second status control attribute is not true (that is, false), it is not necessary to change the attribute value of the first action status attribute.

For example, the sensing data can be received through various sensors to determine the second data resource (which can also be referred to as the second subject resource). For example, the second data resource can also be the concentration of carbon monoxide, the concentration of PM2.5, the temperature, etc.

For example, the first data resource and the second data resource are different. In some examples, the first data resource may be the concentration of PM2.5, while the second data resource is the concentration of carbon monoxide.

For example, the application entity (e.g., a sensor) may transmit data to the common service entity to update the second data resource.

It should be noted that there is no time sequence for triggering the first action and triggering the second action. For example, the first action can be triggered when the first data resource meets the first triggering condition, the conflict judgment condition is met, and the attribute value of the second action status attribute meets the first dependency condition and/or the attribute value of the second action time attribute meets the second dependency condition. When the second data resource meets the second triggering condition, the second action can be triggered. It should be noted that when the second action resource includes the corresponding dependency condition and the conflict judgment condition, the second action can be triggered when the second data resource meets the second triggering condition, the conflict judgment condition of the second action resource is met, and the corresponding dependency condition of the second action resource is met. For example, in some examples, the second action can be triggered first, and then the first action can be triggered; in other examples, the first action may be triggered first, and then the second action can be triggered.

For example, the second triggering condition can be set according to the actual situation. For example, in some examples, the second triggering condition can be various conditions, such as, the concentration of carbon monoxide is higher than the preset threshold, the concentration of PM2.5 is higher than the preset threshold, the brightness of the indoor light is higher or lower than the preset threshold, the user is detected within a certain range (for example, in the bedroom, a living room, etc.), and the temperature is higher or lower than the preset temperature threshold.

For example, in some examples, the second triggering condition may be different from the first triggering condition. For example, when the first action resource is used to close the window when the smog parameter (that is, the concentration of PM2.5) is greater than the preset threshold A, and the second action resource is used to open the window when the concentration of the carbon monoxide in the air is higher than the preset threshold B, the first triggering condition can be set to be that the smog parameter is greater than the preset threshold A, and the second triggering condition can be set to be that the concentration of carbon monoxide is higher than the preset threshold B.

For example, the second action resource also includes a second action time attribute, the second action time attribute is used to indicate a time parameter related to the second action. The execution method also includes setting the attribute value of the second action time attribute after the second action is executed. The method of setting the attribute value of the second action time attribute can be the same as the method of setting the attribute value of the first action time attribute, and the repetition will not be repeated herein again.

It should be noted that every time the first action is executed, the attribute value of the first action time attribute is reset, that is, the attribute value of the first action time attribute is cleared to zero; similarly, every time the second action is executed, the attribute value of the second action time attribute is reset, that is, the attribute value of the second action time attribute is cleared to zero.

In addition, in the embodiment of the execution method of an action, for the detailed description of the first action resource and the second action resource, reference may be made to the related description in the embodiment of the creation method for creating the action resource, and the repetition will not be repeated herein again.

Figure 9:
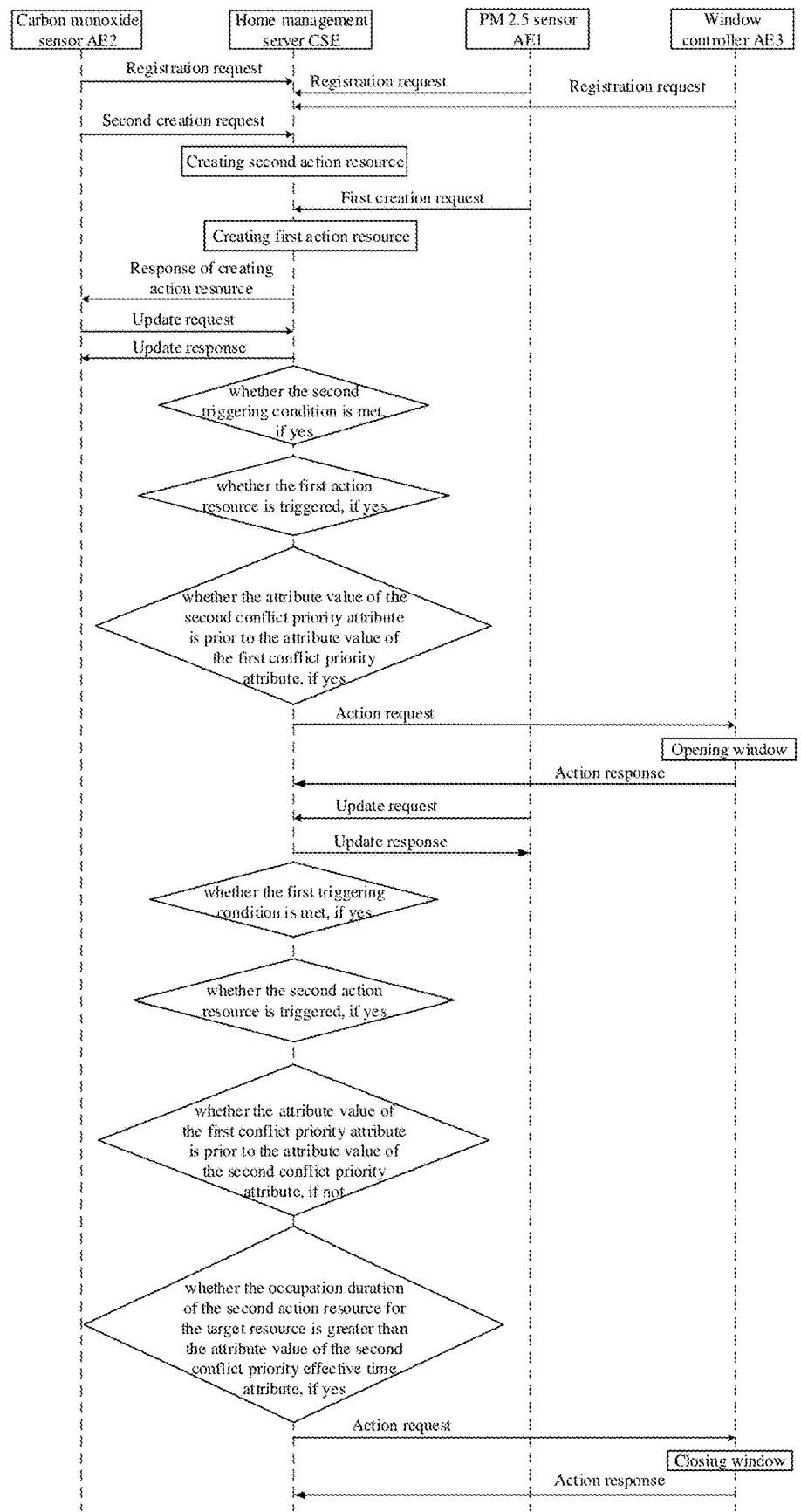
FIG. 9 shows a schematic diagram of a schematic example of performing a triggering operation on a target resource provided by some embodiments of the present disclosure.

FIG. 9 shows a schematic example of performing triggering operation on the target resource provided by some embodiments of the present disclosure. The example shown in FIG. 9 takes the embodiment of the action resources as shown in Tables 1 and 2 as examples.

For example, as shown in FIG. 9, the PM 2.5 sensor AE1 (e.g., the air monitoring device), the carbon monoxide sensor AE2 (e.g., the gas monitoring device), and the window controller AE3 are registered to the home management server CSE (i.e., the common service entity), respectively.

In the process of creating the action resource, the carbon monoxide sensor AE2 can send a second creation request of the second action resource to the home management server CSE, the second creation request includes the action trigger subject (the carbon monoxide sensor AE2), the target resource (the window), the triggering condition (the concentration of carbon monoxide is greater than the preset threshold B), and the control action (opening the window).

According to the second creation request sent by the carbon monoxide sensor AE2, the home management server CSE can create the second action resource. In some embodiments, before creating the second action resource, it can be judged whether there are other action resources for the same target resource in the home management server CSE. When there are no other action resources for the same target resource, the second action resource can be created according to the second creation request sent by the carbon monoxide sensor AE2.

The PM 2.5 sensor AE1 can send a first creation request of the first action resource to the home management server CSE, and the first creation request includes the action trigger subject (the PM 2.5 sensor AE1), the target resource (the window), the triggering condition (the concentration of PM 2.5 is greater than the preset threshold A), and the control action (closing the window).

According to the first creation request sent by the PM 2.5 sensor AE1, the home management server CSE can create the first action resource.

For example, after the first action resource is created, the home management server CSE can return a response of creating the action resource successfully to the PM 2.5 sensor AE1 to indicate that the first action resource is created successfully; when the second action resource is created, the home management server CSE can return a response of successfully creating the action resource to the carbon monoxide sensor AE2 to indicate that the second action resource is successfully created. It should be noted that in the example shown in FIG. 9, it is described by taking the case that the first action resource and the second action resource conflict with each other (that is, the target resource of the first action resource and the target resource of the second action resource are the same, and the first action corresponding to the first action resource and the second action corresponding to the second action resource are conflict with each other) as an example.

During the operation, the home management server CSE can receive an update request from the carbon monoxide sensor AE2 to update the corresponding second data resource (i.e., the second subject resource). The update request may include data of the carbon monoxide content currently detected by the carbon monoxide sensor AE2. The home management server CSE can send a corresponding update response to the carbon monoxide sensor AE2 after receiving the update request sent by the carbon monoxide sensor AE2.

Then, the home management server CSE can determine whether the data received from the carbon monoxide sensor AE2 meets the triggering condition (that is, the second triggering condition) of the second action resource, if the second data resource meets the triggering condition of the second action resource, the home management server CSE can determine whether the first action resource is triggered or not, and if the first action resource is triggered, the home management server CSE can determine whether the attribute value of the second conflict priority attribute of the second action resource is prior to the attribute value of the first conflict priority attribute of the first action resource, if the attribute value of the second conflict priority attribute is prior to the attribute value of the first conflict priority attribute of the first action resource, the home management server CSE can send an action request to the window controller AE3 and notify the window controller AE3 to perform the action of opening the window. After the opening operation is performed, the window controller AE3 can send an action response to the home management server CSE.

For example, the home management server CSE can also receive an update request from the PM 2.5 sensor AE1 to update the corresponding first data resource (i.e., the first subject resource). For example, the update request includes the data of the concentration of PM 2.5 currently detected by the PM 2.5 sensor AE1. In some embodiments, such update request may be sent periodically at a preset frequency, or may be sent in response to changes in detected data. For example, an update request may be sent to the home management server CSE when it is determined that the detected data is higher than the preset threshold A. The home management server CSE can send a corresponding update response to the PM 2.5 sensor AE1 after receiving the update request sent by the PM 2.5 sensor AE1.

Then, the home management server CSE can judge whether the triggering condition of the first action resource (i.e. the first triggering condition) is met according to the data of the concentration of PM 2.5 in the updated first data resource, if the first data resource meets the triggering condition of the first action resource, the home management server CSE can judge whether the second action resource is triggered, if the second action resource is triggered, the home management server CSE can determine whether the attribute value of the second conflict priority attribute of the second action resource is prior to the attribute value of the first conflict priority attribute of the first action resource, if the attribute value of the first conflict priority attribute is not prior to the attribute value of the second conflict priority attribute, the home management server CSE can determine whether the occupation duration of the second action resource for the target resource is greater than the attribute value of the second conflict priority effective time attribute, if the occupation duration of the second action resource for the target resource is greater than the attribute value of the second conflict priority effective time attribute, the home management server CSE can send an action request to the window controller AE3. The window controller AE3 can close the window according to the received action request. After the closing operation is performed, the window controller AE3 can send an action response to the server CSE.

It should be noted that in the present disclosure, the update request may include requesting the home management server CSE to update or set any attribute value of the first action resource or any attribute value of the second action resource, for example, any attribute value selected from a group consisting of the attribute value of the first conflict priority attribute, the attribute value of the first conflict priority effective time attribute, the attribute value of the first action status attribute, the attribute value of the first action time attribute, the attribute value of the first reverse action attribute, and the attribute value of the first status control attribute in the first action resource may be updated or set. The present disclosure does not limit this.

Figure 10:
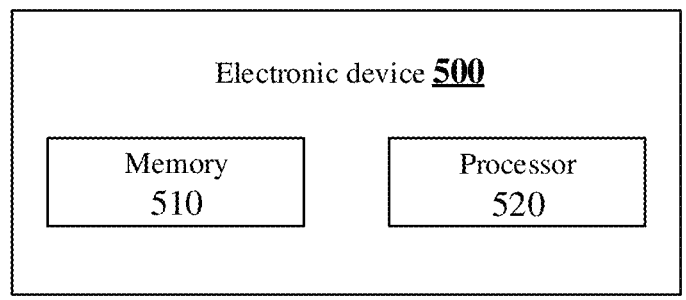
FIG. 10 is a schematic diagram of an electronic device provided by some embodiments of the present disclosure.

Some embodiment of the present disclosure also provide an electronic device. FIG. 10 is a schematic diagram of an electronic device provided by some embodiments of the present disclosure.

For example, as shown in FIG. 10, the electronic device 500 may include a memory 510 and a processor 520. It should be noted that the components of the electronic device 500 as shown in FIG. 10 are only exemplary and not restrictive, and the electronic device 500 may also have other components according to actual application requirements.

For example, the memory 510 is used to store computer-readable instructions in a non-transitory manner; the processor 520 is used to execute the computer-readable instructions, and when the computer-readable instructions are executed by the processor 520, the creation method for creating an action resource according to any of the above embodiments is executed.

For example, components, such as the memory 510 and the processor 520, etc., can communicate through a network connection. The network may include a wireless network, a wired network, and/or any combination of the wireless network and the wired network. The network may include a local area network, the Internet, a telecommunication network, the Internet of Things based on the Internet and/or the telecommunication network, and/or any combination of the above networks, etc. The wired network can communicate by means such as a twisted pair, coaxial cable, or optical fiber transmission, etc., and the wireless network can communicate by means such as 3G/4G/5G mobile communication network, Bluetooth, Zigbee, or WiFi, etc. The present disclosure does not limit types and functions of the network herein.

For example, the processor 520 may control other components in the electronic device 500 to perform desired functions. The processor 520 can be a central processing unit (CPU), a microprocessor, and other devices with data processing capability and/or program execution capability. The central processing unit (CPU) can be X86 or ARM architecture, etc.

For example, the memory 510 may include any combination of one or more computer program products, the computer program products may include various forms of computer-readable storage media, such as volatile memory and/or non-volatile memory. The volatile memory may include, for example, a random access memory (RAM) and/or a cache or the like. The non-volatile memory may include, for example, a read only memory (ROM), a hard disk, an erasable programmable read only memory (EPROM), a portable compact disc-read only memory (CD-ROM), an USB memory, a flash memory, etc. The one or more computer-readable instructions can be stored on the computer-readable storage medium, and the processor 510 can execute the computer-readable instructions to achieve various functions of the electronic device 500. The various application programs, various data, and the like can also be stored in the storage medium.

For example, for the detailed description of the process of creating the action resource performed by the electronic device 500, reference can be made to the related descriptions in the embodiment of the creation method for creating the action resource, and the repetition parts will not be repeated herein again.

Some embodiment of the present disclosure also provide an electronic device. For example, the electronic device may include a memory and a processor. The memory is used for storing computer-readable instructions non-temporarily; the processor is used to execute the computer-readable instructions, when the computer-readable instructions are executed by the processor, the processor is caused to execute the execution method of an action according to any of the above embodiments. It should be noted that for the detailed description of the memory and the processor, reference can be made to the above related description, and will not be repeated herein again. For the detailed description of the process of the electronic device executing the action resource, reference can be made to the related descriptions in the embodiment of the execution method of an action, and the repetition parts will not be repeated herein again.

Figure 11:
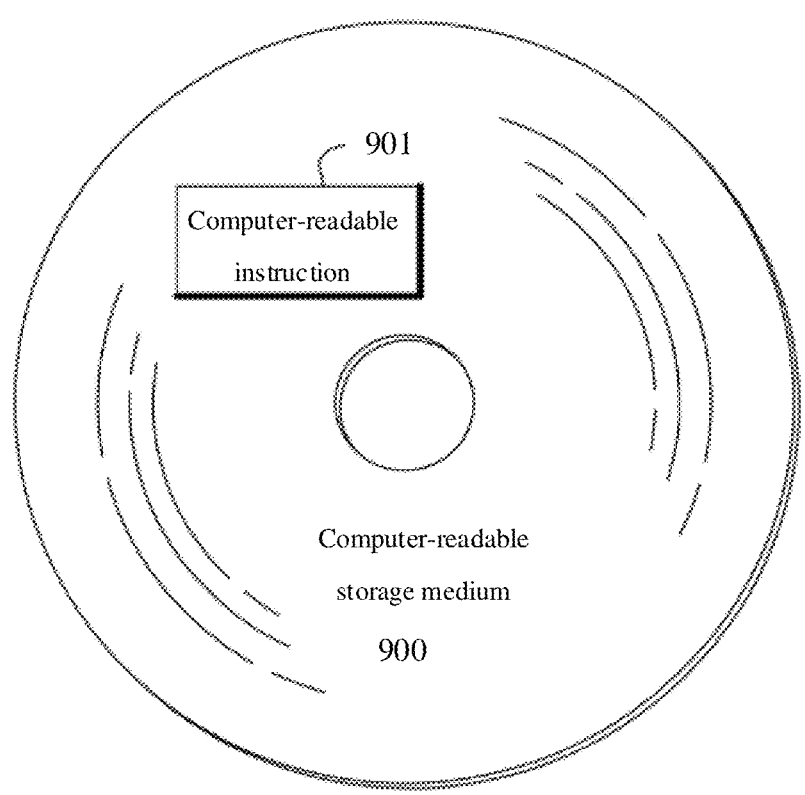
FIG. 11 is a schematic diagram of a computer-readable storage medium provided by some embodiments of the present disclosure.

Some embodiment of the present disclosure also provide a computer-readable storage medium. FIG. 11 is a schematic diagram of a computer-readable storage medium provided by some embodiments of the present disclosure. For example, as shown in FIG. 11, one or more computer-readable instructions 901 can be stored on a computer-readable storage medium 900 in a non-transitory manner. For example, when the computer-readable instruction 901 is executed by a computer, the computer is caused to execute one or more steps in the creation method for creating the action resource or the execution method of the action according to any of the above embodiments.

For example, the computer-readable storage medium 900 can be applied to the above-mentioned electronic device, for example, the computer-readable storage medium 900 can be the memory in the electronic device.

For example, for the description of the computer-readable storage medium 900, reference may be made to the description of the memory in the embodiment of the electronic device described in any of the above embodiments, and the repetition parts will not be repeated herein again.

For the present disclosure, the following statements should be noted:

(1) The accompanying drawings of the embodiment(s) of the present disclosure involve only the structure(s) related to the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should be understood that, in the case in which a component or element such as a layer, film, region, substrate or the like is referred to be "on" or "under" another component or element, the component or element may be "directly" "on" or "under" the another component or element or a component or element is interposed therebetween.

(3) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A creation method for creating an action resource, comprising:
  receiving a first creation request, wherein the first creation request comprises a target resource; and
  creating a first action resource according to the first creation request, wherein the first action resource is a resource used for triggering a first action for the target resource,
  wherein creating the first action resource comprises:
  creating at least one selected from a group consisting of a first conflict priority attribute and a first conflict priority effective time attribute for the first action resource,
  wherein the first conflict priority attribute represents a priority of the first action resource relative to an action resource that conflicts with the first action resource and is aimed at the target resource, and the first conflict priority effective time attribute represents a time range in which the first action resource has exclusive access to the target resource.

2. The creation method according to claim 1, wherein creating the first action resource further comprises:
  creating a first conflict target resource attribute and a first conflict target action attribute for the first action resource,
  wherein the first conflict target resource attribute represents an identification code of the target resource, and the first conflict target action attribute represents an action that conflicts with the first action.

3. The creation method according to claim 1, wherein creating the first action resource further comprises:
  creating a first conflict target resource attribute and a first conflict target action attribute for the first action resource,
  wherein the first conflict target resource attribute represents an identification code of the target resource, the first conflict target action attribute represents an action that conflicts with the first action, the first action resource comprises a conflict policy sub-resource, and the conflict policy sub-resource comprises the first conflict target resource attribute, the first conflict target action attribute, and at least one selected from the group consisting of the first conflict priority attribute and the first conflict priority effective time attribute.

4. The creation method according to claim 1, wherein creating the first action resource further comprises:
  creating a first action status attribute for the first action resource, wherein the first action status attribute represents a status of the first action.

5. The creation method according to claim 4, wherein creating the first action resource further comprises:
  creating a first action time attribute for the first action resource, wherein the first action time attribute is used to indicate a time parameter related to the first action.

6. The creation method according to claim 1, wherein creating the first action resource further comprises:
  creating a first action time attribute for the first action resource, wherein the first action time attribute is used to indicate a time parameter related to the first action.

7. The creation method according to claim 5, wherein the time parameter related to the first action comprises at least one selected from a group consisting of a duration after the first action is executed, start time of executing the first action, and end time of executing the first action.

8. An execution method of an action, comprising:
  determining a first action resource, wherein the first action resource is a resource used for triggering a first action for a target resource, the first action resource comprises a first conflict priority attribute, and the first conflict priority attribute represents a priority of the first action resource relative to an action resource that conflicts with the first action resource and is aimed at the target resource;
  receiving a first data resource;
  determining a second action resource, conflicting with the first action resource, based on the first data resource meeting a first triggering condition, wherein the second action resource is a resource used for triggering a second action for the target resource, the second action resource comprises a second conflict priority attribute and a second conflict priority effective time attribute, the second conflict priority attribute represents a priority of the second action resource relative to an action resource that conflicts with the second action resource and is aimed at the target resource, and the second conflict priority effective time attribute represents a time range in which the second action resource has exclusive access to the target resource;

acquiring and judging whether an attribute value of the first conflict priority attribute, an attribute value of the second conflict priority attribute, and an attribute value of the second conflict priority effective time attribute meet a conflict judgment condition, executing the first action on the target resource if the conflict judgment condition is met; not executing the first action if the conflict judgment condition is not met.

9. The execution method according to claim 8, wherein meeting the conflict judgment condition comprises that:

the attribute value of the first conflict priority attribute has priority over the attribute value of the second conflict priority attribute; or an occupation duration of the second action resource for the target resource is greater than or equal to the attribute value of the second conflict priority effective time attribute; or the attribute value of the first conflict priority attribute has priority over the attribute value of the second conflict priority attribute, and the occupation duration of the second action resource for the target resource is greater than or equal to the attribute value of the second conflict priority effective time attribute.

10. The execution method according to claim 9, wherein judging whether the attribute value of the first conflict priority attribute, the attribute value of the second conflict priority attribute, and the attribute value of the second conflict priority effective time attribute meet the conflict judgment condition comprises:

judging whether the attribute value of the first conflict priority attribute has priority over the attribute value of the second conflict priority attribute, and in a case where the attribute value of the first conflict priority attribute has priority over the attribute value of the second conflict priority attribute, determining that the conflict judgment condition is met; and in a case where the attribute value of the first conflict priority attribute does not have priority over the attribute value of the second conflict priority attribute, acquiring the occupation duration of the second action resource for the target resource, and judging whether the occupation duration of the second action resource for the target resource is greater than the attribute value of the second conflict priority effective time attribute, in a case where the occupation duration of the second action resource for the target resource is greater than or equal to the attribute value of the second conflict priority effective time attribute, determining that the conflict judgment condition is met; and in a case where the occupation duration of the second action resource for the target resource is less than the attribute value of the second conflict priority effective time attribute, determining that the conflict judgment condition is not met.

11. The execution method according to claim 10, wherein the second action resource further comprises a second action time attribute, acquiring the occupation duration of the second action resource for the target resource comprises:

acquiring an attribute value of the second action time attribute as the occupation duration of the second action resource for the target resource.

12. The execution method according to claim 8, wherein determining the second action resource that conflicts with the first action resource comprises:

determining a candidate action resource list according to the target resource and the first action, wherein a candidate target resource corresponding to each candidate action resource in the candidate action resource list is identical to the target resource, and a candidate action of each candidate action resource conflicts with the first action;

selecting at least one candidate action resource from the candidate action resource list;

acquiring an execution status of the at least one candidate action resource; and in a case of determining that the execution status of the at least one candidate action resource is already executed, taking the at least one candidate action resource as the second action resource.

13. The execution method according to claim 8, wherein the first action resource comprises a conflict policy sub-resource, wherein the conflict policy sub-resource comprises the first conflict priority attribute, a first conflict priority effective time attribute, a first conflict target resource attribute, and a first conflict target action attribute, the first conflict priority effective time attribute represents a time range in which the first action resource has exclusive access to the target resource, the first conflict target resource attribute represents an identification code of the target resource, and the first conflict target action attribute represents an action that conflicts with the first action, determining the second action resource that conflicts with the first action resource comprises:

acquiring the first conflict target resource attribute and the first conflict target action attribute, and determining a candidate action resource list according to the first conflict target resource attribute and the first conflict target action attribute, wherein an identification code of a candidate target resource corresponding to each candidate action resource in the candidate action resource list is identical to the first conflict target resource attribute, and a candidate action of each candidate action resource is identical to the first conflict target action attribute;

selecting at least one candidate action resource from the candidate action resource list;

acquiring an execution status of the at least one candidate action resource;

in a case of determining that the execution status of the at least one candidate action resource is already executed, taking the at least one candidate action resource as the second action resource.

14. The execution method according to claim 12, wherein each candidate action resource comprises an action status attribute, acquiring the execution status of the at least one candidate action resource comprises:

acquiring an attribute value of an action status attribute of the at least one candidate action resource as the execution status of the at least one candidate action resource.

15. The execution method according to claim 8, wherein the first action and the second action conflict with each other.

16. The execution method according to claim 15, wherein the first action and the second action are opposite to each other.

17. An execution method of an action, comprising:

determining a first action resource, wherein the first action resource is a resource used for triggering a first action for a target resource, the first action resource comprises a first conflict priority attribute, and the first conflict priority attribute represents a priority of the first action resource relative to an action resource that conflicts with the first action resource and is aimed at the target resource;

receiving a first data resource;

determining a second action resource, which conflicts with the first action resource, based on the first data resource meeting a first triggering condition, wherein the second action resource is a resource used for triggering a second action for the target resource, the second action resource comprises a second conflict priority attribute, and the second conflict priority attribute represents a priority of the second action resource relative to an action resource that conflicts with the second action resource and is aimed at the target resource;

acquiring and judging whether an attribute value of the first conflict priority attribute and an attribute value of the second conflict priority attribute meet a conflict judgment condition, executing the first action on the target resource if the conflict judgment condition is met; not executing the first action if the conflict judgment condition is not met.

18. An electronic device, comprising:
a memory, for storing computer-readable instructions in a non-transitory manner; and
a processor, for executing the computer-readable instructions,
wherein in a case where the computer-readable instructions are executed by the processor, the creation method according to claim 1 is performed.

19. An electronic device, comprising:
a memory, for storing computer-readable instructions in a non-transitory manner; and
a processor, for executing the computer-readable instructions,
wherein the computer-readable instructions, when executed by the processor, cause the processor to execute the execution method according to claim 8.

20. A computer-readable storage medium, storing computer-readable instructions non-temporarily, wherein in a case where the computer-readable instructions are executed by a computer, the computer is caused to execute the creation method according to claim 1.

* * * * *